United States Patent

Ioka et al.

[11] Patent Number: 6,020,935
[45] Date of Patent: Feb. 1, 2000

[54] RELAY BASED CONTROL SYSTEM

[75] Inventors: Shoichi Ioka; Masahiro Takeuchi; Seiji Sato, all of Kanagawa, Japan

[73] Assignee: Sony Corporation, Tokyo, Japan

[21] Appl. No.: 08/927,762

[22] Filed: Sep. 11, 1997

[30] Foreign Application Priority Data

Sep. 13, 1996 [JP] Japan .................................. 8-242898
Aug. 12, 1997 [JP] Japan .................................. 9-217321

[51] Int. Cl.$^7$ .............................. H04N 5/30; H04N 7/18
[52] U.S. Cl. ...................... 348/722; 348/705; 348/150; 348/153; 348/213
[58] Field of Search .................................. 348/722, 705, 348/159, 152, 153, 143, 211, 212, 213, 207; H04N 5/30, 7/18

[56] References Cited

U.S. PATENT DOCUMENTS

| | | | |
|---|---|---|---|
| 5,036,395 | 7/1991 | Reimers | 348/705 |
| 5,206,732 | 4/1993 | Hudson | 358/209 |
| 5,264,929 | 11/1993 | Yamaguchi | 348/705 |
| 5,265,004 | 11/1993 | Schultz et al. | 364/140.05 |
| 5,786,850 | 7/1998 | Pritchett et al. | 349/159 |
| 5,822,012 | 10/1998 | Jeon et al. | 348/553 |

*Primary Examiner*—John K. Peng
*Assistant Examiner*—Jean M. Désir
*Attorney, Agent, or Firm*—Frommer Lawrence & Haug, LLP.; William S. Frommer

[57] ABSTRACT

The relay apparatus comprises the matrix switch 61 and the CPU 62 to which control data are supplied from input devices. The CPU 62 detects whether it is possible to change the state of the specified electronic device according to the control data and controls transmission of the control data to the specified electronic device according to the result of the detection. The control data comprises change control data and reference control data for requesting the state of the selected electronic device to be changed and to be referred, respectively. In other words, the CPU 62 controls the matrix switch 61 so that both the change control data and the reference control data are transmitted to the selected electronic device when it is detected to be possible to change the state of the specified electronic device with control data and only the reference control data is transmitted to the specified electronic device when it is detected to be impossible to change the state of the selected electronic device.

18 Claims, 20 Drawing Sheets

FIG. 12

MSU assignment [1-24cam]

RELAY BASED CONTROL SYSTEM

BACKGROUND OF THE INVENTION

This invention relates to a control signal relay apparatus and a control system, more particularly to a control signal relay apparatus and a control system enabling assignment of AV devices to each input device used in an AV processing system connected to a plurality of AV (Audio Visual) devices and a plurality of input devices for controlling those AV devices.

In the case of an AV processing system used in an imaging studio (a system in this specification means a group comprising a plurality of devices connected to each other logically. It is not required necessarily whether all of those devices are housed in a case or not), a control panel installed in the studio's control room is used for adjustment (the iris, etc.) of a plurality of video cameras (studio cameras) installed in the studio.

In an AV processing system installed in a facility comprising a plurality of imaging studios, only one control panel might be used to adjust or control video cameras in all those studios in some cases.

In the case that one control panel is used to adjust video cameras in all studios in a facility comprising a plurality imaging studios, however, the control panel must be provided with an operation unit corresponding to each video camera in each studio, so the structure of the control panel becomes very complicated, degrading its controllability. This is a problem of such the related art AV processing system.

On the other hand, in the case that a control panel is provided in each studio, for example, when a plurality of studios are used as one large studio by removing the partitions, a plurality of video cameras in the one large studio is adjusted from each of a plurality of the original studio control rooms. Thus, it will be impossible to adjust those video cameras from one control panel and the controllability will not still be improved at all.

Under such the circumstances, it is an object of this invention to enable assignment of electronic devices whose states can be controlled to each of a plurality of input devices to be changed easily in a system comprising a plurality of electronic devices, and a plurality of input devices used to control those electronic devices, so that the controllability of the system can be improved significantly.

SUMMARY OF THE INVENTION

The above object is accomplished by a control signal relay apparatus wherein the control signal relay apparatus receives a control signal from the first control signal input device and a control signal from the second control signal input device, the control signal from the first control signal input device including control object information for indicating an electronic device as a control object and control value information, and the control signal from the second control signal input device including the control object information and the control value information, controls a state of the electronic device indicated by the control object information out of a plurality of electronic devices according to the control signals from the first and second control signal input devices, receives a state signal expressing the state of the electronic device indicated by the control object information from the electronic device, and transmits the state signal to at least one of the first and second control signal input device that has transmitted the control object information, the control signal relay apparatus comprising:

a memory for storing first information and second information, the first information indicating an electronic device controllable with the control signal from the first control input device and the second information indicating an electronic device controllable with the control signal from the second control signal input device;

a control signal receiver for receiving the control signals;

the first transmitter for transmitting the control value information and state requesting information for requesting the state signal from the electronic device to the electronic device;

a state signal receiver for receiving the state signal;

a state signal transmitter for transmitting the state signal to at least one of the first and second control signal input device that has transmitted the control object information;

an extracting device for extracting the control object information indicating the control object electronic device from the control signals received by the control signal receiver;

a detector for detecting whether it is possible to control the electronic device selected by the control object information with the control signals by comparing the control object information with the first or second information stored in the memory; and a controller for controlling the first transmitter and the state signal transmitter so that when the detector detects that an electronic device corresponding to the control object information can be controlled with the control signal, the first transmitter transmits both of the control value information and the state requesting information to the electronic device corresponding to the control object information, then the state signal transmitter sends back the state signal received from the electronic device corresponding to the control object information to at least one of the first and second control signal input devices that has transmitted the control signal, and when the detector detects that the electronic device corresponding to the control object information cannot be controlled with the control signal, the first transmitter transmits only the state requesting information to the electronic device corresponding to the control object information, then the state signal transmitter sends back the state signal received from the electronic device corresponding to the control object information to at least one of the first and second control signal input device that has transmitted the control signal.

The object is also accomplished by a control system for electronic devices, comprising:

the first control signal input device;

the second control signal input device; and a control signal relay apparatus receiving a control signal from the first control signal input device and a control signal from the second control signal input device, the control signal from the first control signal input device including control object information for indicating an electronic device as a control object and control value information, and the control signal from the second control signal input device including the control object information and the control value information, controlling a state of the electronic device indicated by the control object information out of a plurality of electronic devices according to the control signals from the first and second control signal input devices, receiving a state signal expressing the state of the electronic device indicated by the control object information from the electronic device, and transmitting the state signal to at least one of the first and second control signal input device that has transmitted the control object information.

The control signal relay apparatus comprises:

a memory for storing first information and second information, the first information indicating an electronic device controllable with the control signal from the first control signal input device and the second information indicating an electronic device controllable with the control signal from the second control signal input device;

a control signal receiver for receiving the control signals;

the first transmitter for transmitting the control value information and state requesting information for requesting the state signal from the electronic device to the electronic device;

a state signal receiver for receiving the state signal;

a state signal transmitter for transmitting the state signal to at least one of the first and second control signal input device that has transmitted the control object information;

an extracting device for extracting the control object information indicating the control object electronic device from the control signals received by the control signal receiver;

a detector for detecting whether it is possible to control the electronic device indicated by the control object information with the control signals by comparing the control object information with the first or second information stored in the memory; and a controller for controlling the first transmitter and the state signal transmitter so that when the detector detects that an electronic device corresponding to the control object information can be controlled with the control signal, the first transmitter transmits both of the control value information and the state requesting information to the electronic device corresponding to the control object information, then the state signal transmitter sends back the state signal received from the electronic device corresponding to the control object information to at least one of the first and second control signal input devices that has transmitted the control signal, and when the detector detects that the electronic device corresponding to the control object information cannot be controlled with the control signal, the first transmitter transmits only the state requesting information to the electronic device corresponding to the control object information, then the state signal transmitter sends back the state signal received from the electronic device corresponding to the control object information to at least one of the first and second control signal input device that has transmitted the control signal.

The object is further accomplished by a relay apparatus wherein the relay apparatus receives control data transmitted from a plurality of input devices each of which control data includes control object information indicating an electronic device as a control object and control information expressing a control item of the electronic device and transmits the control data to at least one of the electronic devices indicated by the control object information out of a plurality of the electronic devices, and further receives state data expressing a state of the electronic device transmitted from at least one of the electronic devices that has received the control data and transmits the state data to at least one of the input devices which has transmitted the control data out of a plurality of the input devices so as to repeat the control data and state data.

The relay apparatus comprises:

a control data receiver for receiving the control data transmitted from the input devices;

a control data transmitter for transmitting the control data to the electronic device;

a state data receiver for receiving the state data transmitted from the electronic device;

a state data transmitter for transmitting the state data to the input device;

an extracting device for extracting the control object information from the control data received by the control data receiver;

a detector for detecting whether the state of the electronic device corresponding to the control object information can be changed; and a controller for controlling the control data transmitter and the state data transmitter according to detection results of the detector.

The control data includes change control data with information arranged for requesting change of the state of the electronic device and reference control data with information arranged for requesting to refer to the state of the electronic device, and the controller controls the control data transmitter and the state data transmitter so that when the detector detects that the state of the electronic device corresponding to the control object information can be changed, the control data transmitter transmits both of the change control data and reference control data to the electronic device corresponding to the control object information and the state data transmitter transmits the state data received from the electronic device to the input device that has transmitted the control data, and when the detector detects that the state of the electronic device corresponding to the control object information cannot be changed, the control data transmitter transmits only the reference control data out of the change control data and the reference control data to the electronic device corresponding to the control object information and the state data transmitter transmits the state data received from the electronic device to the input device that has transmitted the control data.

The object is still further accomplished by a control system for controlling a plurality of electronic devices wherein the control system comprises a plurality of input devices each transmitting control data including control object information indicating an electronic device as a control object and control information expressing a control item, and a relay apparatus for repeating the control data and the state data by receiving the control data transmitted from a plurality of the input devices and transmitting the control data to at least one of electronic devices indicated by the control object information out of a plurality of the electronic devices, and further by receiving state data expressing a state of the selected electronic device transmitted from at least one of the electronic devices that has received the control data and transmitting the state data to at least one of the input devices which has transmitted the control data out of a plurality of the input devices.

The relay apparatus comprises:

a control data receiver for receiving the control data transmitted from the input devices;

a control data transmitter for transmitting the control data to the electronic device;

a state data receiver for receiving the state data transmitted from the electronic device;

a state data transmitter for transmitting the state data to the input device;

an extracting device for extracting the control object information from the control data received by the control data receiver;

a detector for detecting whether the state of the electronic device corresponding to the control object information can be changed; and a controller for controlling the control data transmitter and the state data transmitter according to detection results of the detector.

The control data includes change control data with information arranged for requesting change of the state of the electronic device and reference control data with information arranged for requesting to refer to the state of the electronic device, and the controller controls the control data transmitter and the state data transmitter so that when the detector detects that the state of the electronic device corresponding to the control object information can be changed, the control data transmitter transmits both of the change control data and reference control data to the electronic device corresponding to the control object information and the state data transmitter transmits the state data received from the electronic device to the input device that has transmitted the control data, and when the detector detects that the state of the electronic device corresponding to the control object information cannot be changed, the control data transmitter transmits only the reference control data out of the change control data and the reference control data to the electronic device corresponding to the control object information and the state data transmitter transmits the state data transmitted from the electronic device to the input device that has transmitted the control data.

BRIEF DESCRIPTION OF THE DRAWINGS

FIG. 12 is the control level setting screen;

DETAILED DESCRIPTION OF THE PREFERRED EMBODIMENT

Figure 1:
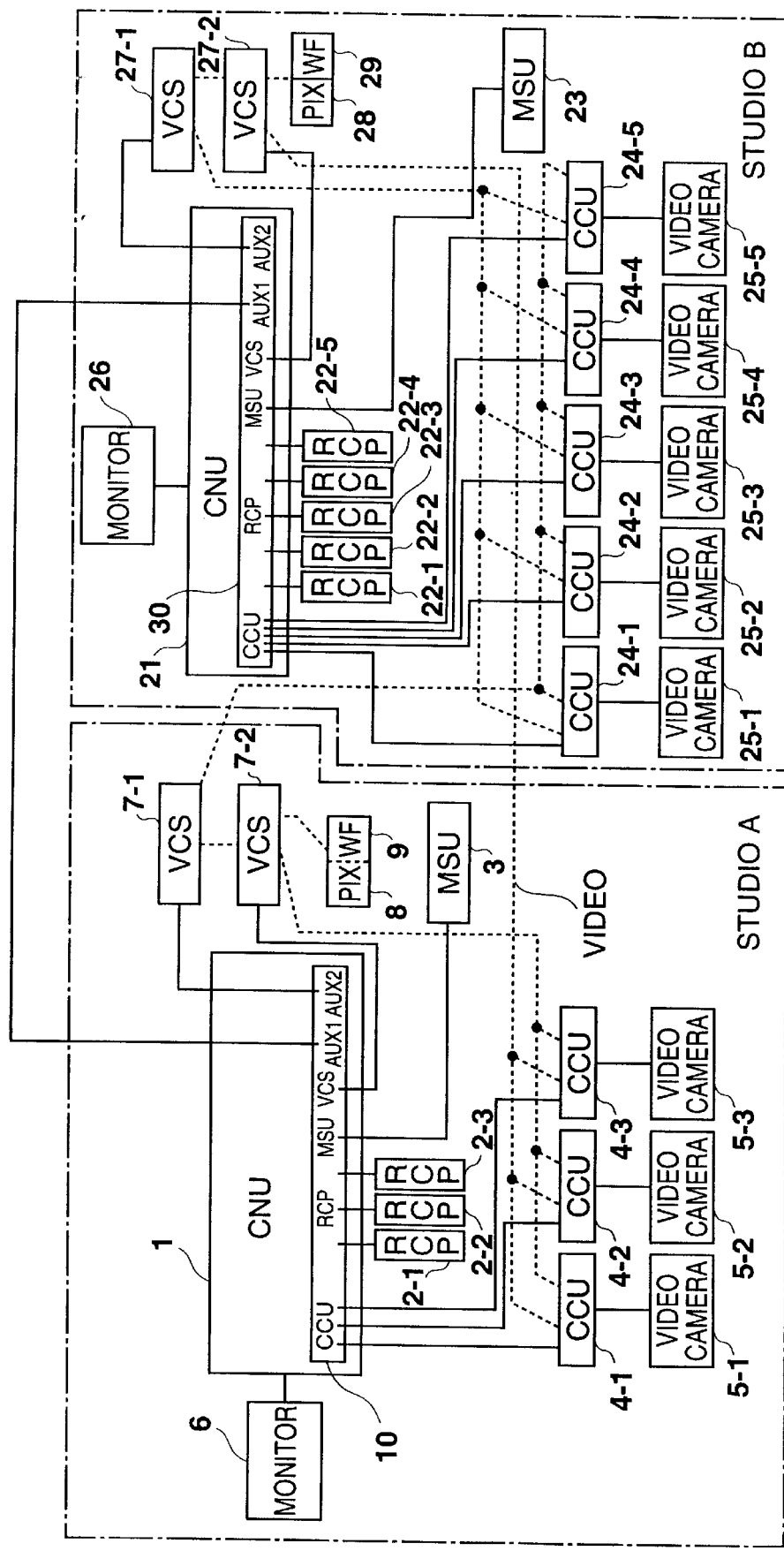
FIG. 1 is a block diagram of a configuration of the AV processing system of this invention in the third embodiment.

FIG. 1 is a configuration of the AV processing system of this invention for broadcasting in the first embodiment.

In FIG. 1, an AV processing system is formed over two imaging studios (studio A and studio B).

In studio A, a camera command network unit (CNU) 1 is provided with a removable extended board 10. The CNU 1 is connected to remote control panels (RCP) 2-1 to 2-3, input devices such as a master setup unit (MSU) 3, etc., AV devices (electronic devices) such as camera control units (CCU) 4-1 to 4-3 via terminals of the extended board 10, so that the CNU 1 relays control and state data exchanged between those input devices and AV devices.

The above mentioned control data is used to control the AV devices (CCU 4-1 to 4-3 described above and video cameras 5-1 to 5-3 to be described later in this case) and it is output from input devices (MSU 3, etc. in this case). State data represents the state of the AV device (for example, adjusting values of color collect, contrast, and saturation in a CCU, as well as adjusting values of iris, white level, and black level in each video camera). It is output from AV devices.

The CNU 1 is also connected to the CNU 21 in studio B via a terminal of the AUX (auxiliary) 1. When the CNU 1 is enabled in the setup by the MSU 3 (to be described later), control data for the AV devices connected to the CNU 21 is output (transmitted) to the CNU 21, as well as it relays state data transmitted from the AV devices via the CNU 21 to the MSU 3.

The RCPs 2-1 to 2-3 are used mainly to adjust CCUs 4-1 to 4-3 and video cameras 5-1 to 5-3 when in imaging, so that the control data corresponding such an adjustment is output to the CNU 1. In other words, RCPs 2-1 to 2-3 are used to change set values of the iris, master black level, and RGB white level that can be adjusted in a simple procedure.

The MSU 3 are used mainly to adjust CCUs 4-1 to 4-3 and video cameras 5-1 to 5-3 when in maintenance, which is more complicated than the adjustment of the RCPs 2-1 to 2-3. The control data corresponding such an adjustment is output to the CNU 1. In other words, the MSU 3 are used to change parameters for controlling the shading in video cameras 5-1 to 5-3, as well as parameters for controlling the color collect, contrast, and saturation in the CCUs 4-1 to 4-3, which are adjusted rather in a complicated procedure.

In this embodiment, each of the RCPs 2-1 to 2-3 is formed as a so-called compact MSU 3 by providing only part of the MSU 3 functions. Conversely speaking, the MSU 3 is provided with all the functions of each of the RCPs 2-1 to 2-3. And, extremely speaking, therefore, in the case that an MSU 3 exists, none of RCPs 2-1 to 2-3 is needed. In this case, however, a target AV device must be selected in the MSU 3 before adjustment. For example, all of the video cameras 5-1 to 5-3 cannot be adjusted at the same time. Thus, when imaging, for example, it becomes impossible to change the irises of all those video cameras 5-1 to 5-3 at the same time. In order to adjust the video cameras 5-1 to 5-3 (or CCUs 4-1 to 4-3) at the same time, therefore, 3 RCPs 2-1 to 2-3 used for adjusting 3 video cameras 5-1 to 5-3 are provided in FIG. 1.

In this embodiment, it can be specified freely so that any RCP of 2-1 to 2-3 can be assigned to any video camera of 5-1 to 5-3 (CCU 4-1 to 4-3).

CCUs 4-1 to 4-3 are used to process video signals output from video cameras 5-1 to 5-3 and output the signals to both the video camera selector (VCS) 7-2 and the VCS 27-2 in studio B. The CCUs 4-1 to 4-3 are used to process signals according to the control data received from the CNU 1.

The video cameras 5-1 to 5-3 are used to photograph objects and supply the video signals of the objects to the CCUs 4-1 to 4-3. The video cameras 5-1 to 5-3, when receiving control data from the CNU 1 via the CCUs 4-1 to 4-3, processes signals according to the control data.

The monitor 6 is connected to the CNU 1 and used to display screens for various specifications to be described later.

The VCS 7-1 receives video signals from video cameras 25-1 to 25-5 (electronic devices) provided in studio B via the CCUs 24-1 to 24-5 (electronic devices) which are also provided in studio B. The VCS 7-1, corresponding to the control data from the CNU 1, selects video signals supplied from one of the CCUs 24-1 to 24-5 in studio B and outputs the video signals to the VCS 7-2. In addition to the output (video signals) from the VCS 7-1, the VCS 7-2 also receives video signals from the video cameras 5-1 to 5-3 via the CCUs 4-1 to 4-3. Furthermore, the VCS 7-2 also selects video signals from one of the CCUs 4-1 to 4-3 or from the VCS 7-1 according to the control data from the CNU 1, then outputs the video signals to both the picture monitor 8 and the waveform monitor 9. The VCSs 7-1 and 7-2 are provided with 6 inputs respectively. Thus, each of them can receive video signals from 6 systems in maximum.

The picture monitor 8 displays images corresponding to the video signals supplied from the VCS 7-2. The waveform monitor displays the waveforms of the video signals supplied from the VCS 7-2.

The AV processing system in studio B comprises devices from a CNU 21 to an extended board 30 just like the AV processing system in studio A comprising devices from the CNU 1 to the extended board 10.

In studio A, however, 3 video cameras 5-1 to 5-3 are provided. In studio B, 5 video cameras 25-1 to 25-5 are provided, as well as 5 CCUs 24-1 to 24-5 and 5 RCPs 22-1 to 22-5 corresponding to those 5 video cameras.

Video signals from video cameras 25-1 to 25-5 are supplied to the VCS 27-1 via CCUs 24-1 to 24-5. The VCS 27-1 selects video signals from one of those video cameras according to the control data from the CNU 21 and outputs the video signals to the VCS 27-2. In addition to the output from the VCS 27-1, the VCS 27-2 also receives video signals from the 3 video cameras 5-1 to 5-3 via the CCUs 4-1 to 4-3. The VCS 27-2 selects video signals from one of those 4 video cameras according to the control data from the CNU 21 and outputs the signals to the picture monitor 28 and the waveform monitor 29 respectively.

Figure 2:
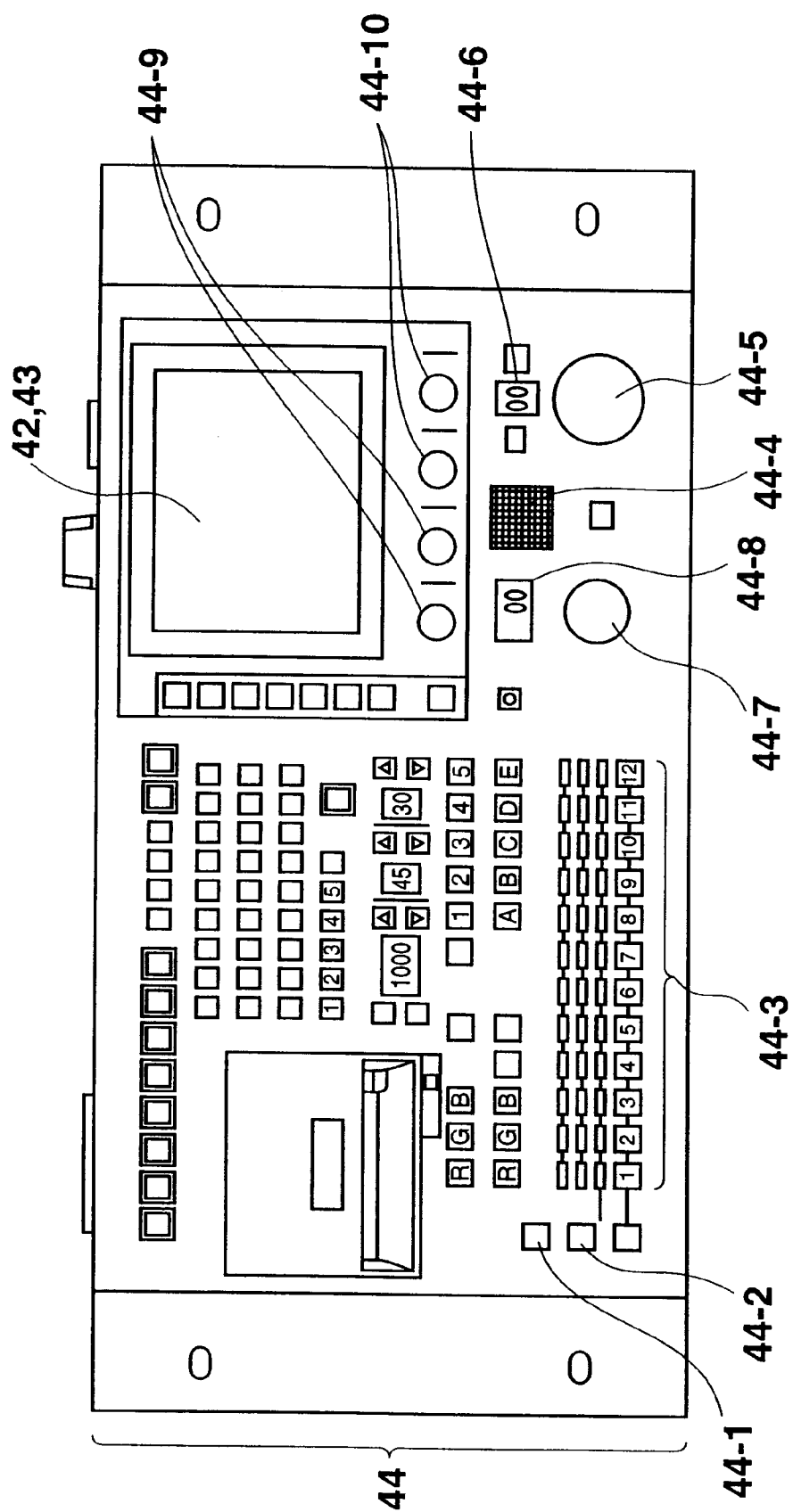
FIG. 2 is a top view of a configuration of the front panel of the MSU 3 and 23 shown in FIG. 1.
Figure 3:
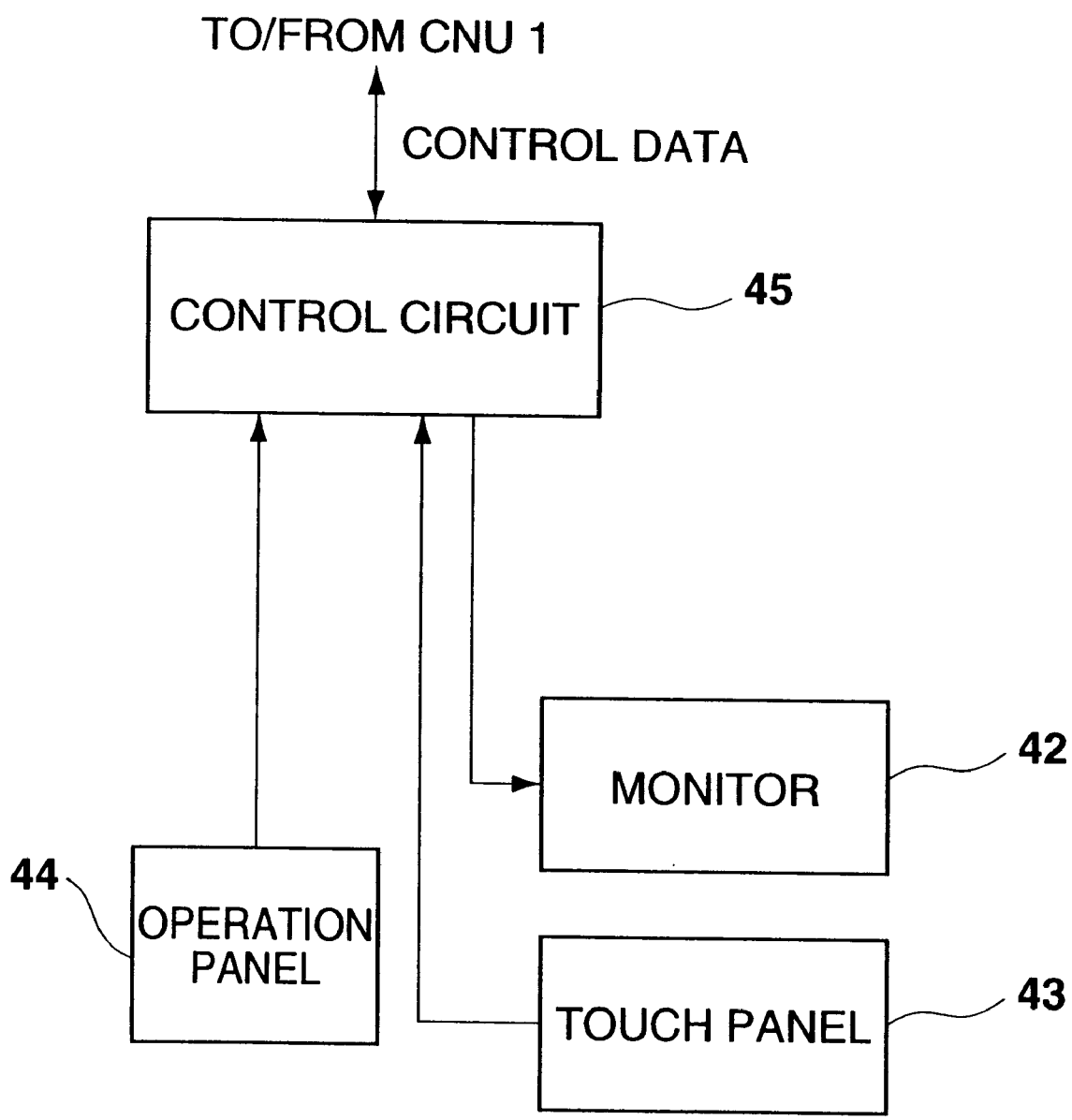
FIG. 3 is a block diagram of an electric configuration of the MSU 3 and 23 shown in FIG. 1.

FIG. 2 shows an external configuration of the MSU 3 shown in FIG. 1. FIG. 3 shows an electric configuration of the MSU 3 respectively. The configuration of the MSU 23 (input device) is also the same as that of the MSU 3.

FIG. 2 shows the front panel of the MSU 3. On the front panel is provided an operation panel comprising a monitor 42, a transparent touch panel 43 arranged on the monitor 42, buttons and knobs, and a display unit displaying the state of each AV device, which is changed according to the operation of those buttons and knobs.

The monitor 42 displays menu screens and buttons (to be described later) according to the control data from the control circuit 45 (FIG. 3). The touch panel 43, when its surface is touched by a finger of the user, outputs the signal corresponding to the touched point to the control circuit 45. And accordingly, the display part of the monitor 42 corresponding to the touched point on the touch panel 43 functions as a button. The operation panel 44, for example, comprises a "Parallel" button 44-1, an "Active" button 44-2, a "Camera Select" button 44-3, a camera display unit 44-4, an iris control knob 44-5, an iris display unit 44-6, a master black control knob 44-7, a master black display unit 44-8, a white control knob 44-9, a black control knob 44-10, and other various buttons, knobs, and display units.

The "Parallel" button 44-1 is pressed in the parallel mode used, when, for example, the RCP 2-1 is assigned to both CCU 4-1 and video camera 5-1, enables both RCP 2-1 and MSU 3 to adjust both CCU 4-1 and video camera 5-1. When the "Parallel" button 44-1 is pressed once, the parallel mode is set and when the button is pressed again, the parallel mode is reset. While the parallel mode is reset, either RCP 2-1 or MSU 3, which is operated later, is validated.

The "Active" button 44-2 enables the MSU 3 to adjust the CCU 4-1 and the video camera 5-1. In other words, when the "Active" button 44-2 is pressed, the object device can get a right for adjustment, etc.

The "Camera Select" button 44-3 is pressed to select a video camera. A video camera makes a pair with a CCU. When a video camera is selected, therefore, its counterpart CCU is also selected together. In the case that the "Active" button 44-2 is pressed while the video camera 5-1 (and the CCU 4-1) are selected, for example, by pressing the "Camera Select" button 44-3, then the selected video camera (and the CCU 4-1) can be adjusted from the MSU 3.

The camera display unit 44-4 displays a number corresponding to the video camera selected by operating the "Camera Select" button 44-3.

The iris control knob 44-5 is used to adjust the iris of the video camera selected by operating the camera select button 44-3. The iris display unit 44-6 displays the value of the adjusted iris of the video camera selected by operating the "Camera Select" button 44-3.

The master black control knob 44-7 is used to adjust the master black level of the video camera selected by operating the camera select button 44-3. The master black display unit 44-8 displays the value of the adjusted master black level of the video camera selected by operating the camera select button 44-3.

The white control knob 44-9 is used to adjust the white level of the video camera selected by operating the camera select button 44-3. The black control knob 44-9 is used to adjust the black level of the video camera selected by operating the camera select button 44-3.

The control circuit 45 (FIG. 3), as described above, controls the display of the monitor 42, as well as controls the display of the monitor 6 connected to the CNU 1 according to the signals from the touch panel 43. Furthermore, the control circuit 45 can generate and transmit control data according to the operation signals supplied from the operation panel and can change the display of the camera display unit 44-4. When receiving state data such as adjusted values of the video camera, iris, and master black described above, the control circuit 45 also supplies the adjusted values of the iris, master black, etc. to the operation panel 44, so that the adjusted values are displayed both on the iris display unit 44-6 and on the master black display unit 44-8.

Figure 4:
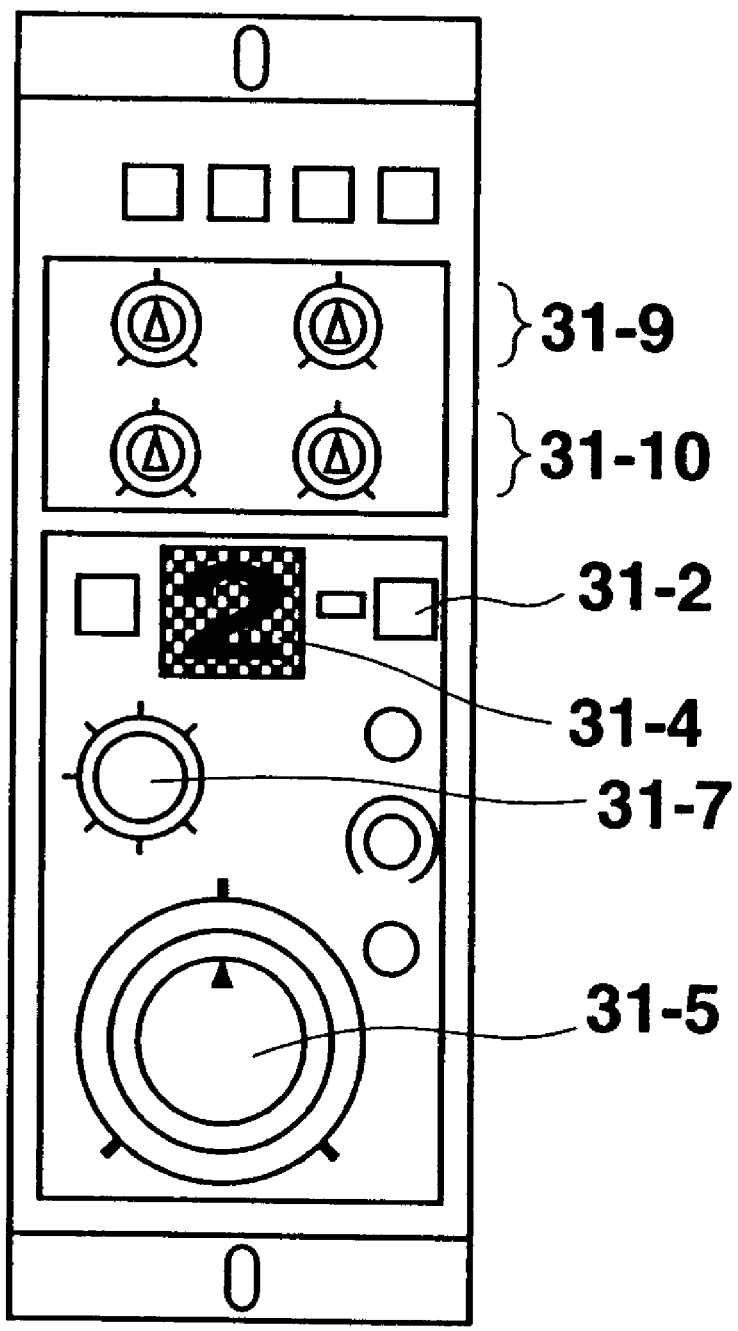
FIG. 4 is a top view of a configuration of the front panel of the RCP 2-1 to 2-3 and 22-1 to 22-5 shown in FIG. 1.

FIG. 4 shows an external configuration of the RCP 2-1 shown in FIG. 1. The configurations of the RCPs 2-2, 2-3, and 22-1 to 22-5 are all the same as that of the RCP 2-1.

FIG. 4 shows the front panel of the RCP 2-1, comprising an "Active" button 31-2, a camera display unit 31-4, an iris control knob 31-5, a master black control knob 31-7, a white control knob 31-9, and a black control knob 31-10.

As described above, the RCP 2-1 is provided with part of the functions of the MSU 3 and it is one of the members of the MSU 3 (FIG. 2). For example, the functions of the "Active" button 31-2, the camera display unit 31-4, the iris control knob 31-5, the master black control knob 31-7, the white control knob 31-9, and the black control knob 31-10 are the same as those of the "Active" button 44-2, the camera display unit 44-4, the iris control knob 44-5, the master black control knob 44-7, the white control knob 44-9, and the black control knob 44-10.

Figure 5A:
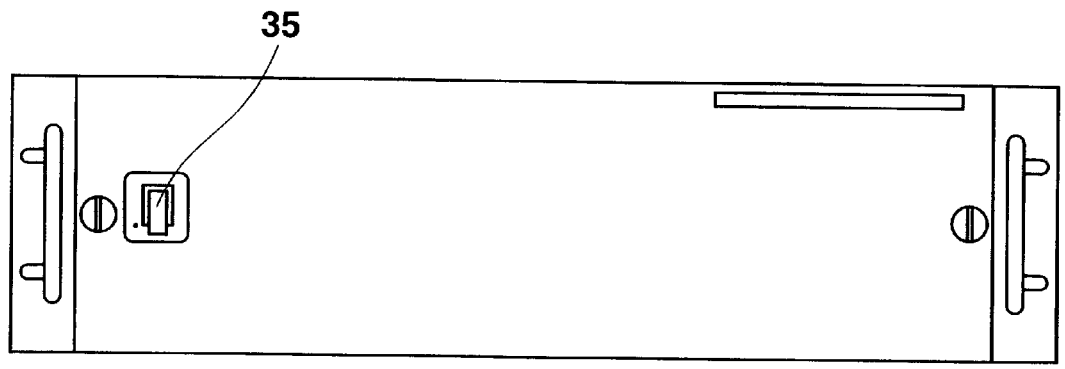
FIG. 5A is a top view of a configuration of the front panel of the CNU 1 and 21 shown in FIG. 1.
Figure 5B:
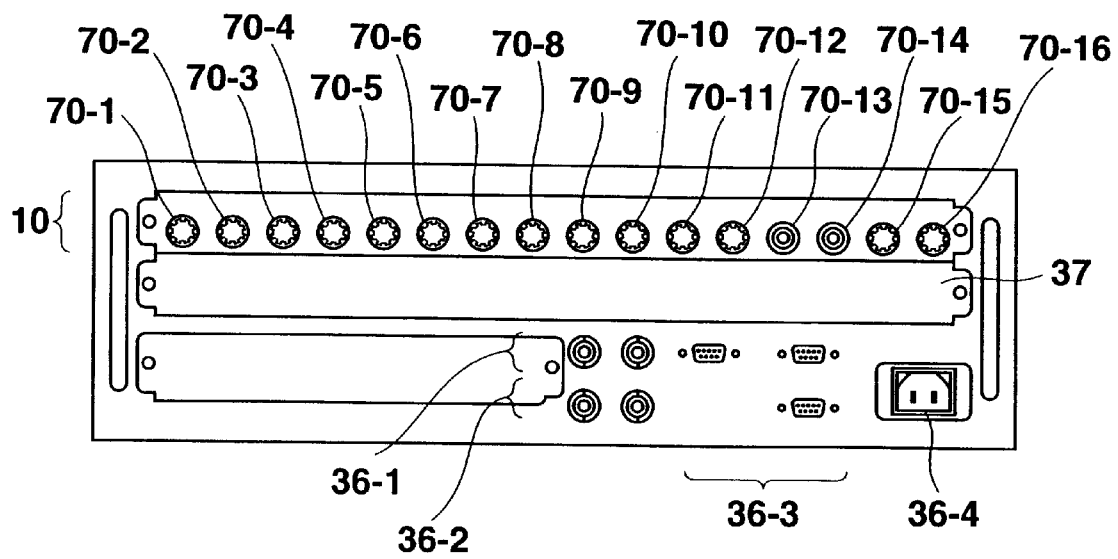
FIG. 5B is a top view of a configuration of the rear panel of the CNU 1 and 21 shown in FIG. 1.

FIG. 5A and 5B show an external configuration of the CNU 1 shown in FIG. 1. The CNU 21 also has the same configuration as that of the CNU 1.

FIG. 5A and FIG. 5B show the front and rear panels of the CNU 1, respectively.

The front panel (FIG. 5A) of the CNU 1 is provided with a power switch 35 used to turn on/off the power supply of the CNU 1.

On the other hand, the rear panel (FIG. 5B) is provided with two slots, each of which can connect an extended board 10. In the embodiment shown in FIG. 5B, the extended board 10 is loaded in the upper one of those two slots. The lower slot is not used here and it is covered by a panel 37. When the panel 37 is removed, an extended board having the same configuration of as that of the extended board 10 can be mounted in the lower slot.

The extended board 10 is provided with six CCU terminals 70-1 to 70-6 used for exchanging data (signals) with the CCU; six RCP terminals 70-7 to 70-12 used for exchanging data with the RCP; an MSU terminal 70-13 used for exchanging data with the MSU; a VCS terminal 70-14 used for exchanging data with the VCS; and two AUX terminals 70-15 and 70-16.

For example, in studio A shown in FIG. 1, the CCUs 4-1 to 4-3 are connected to the CCU terminals 70-1 to 70-3, the RCPs 2-1 to 2-3 connected to the RCP terminals 70-7 to 70-9, the MSU 3 connected to the MSU terminal 70-13, the VCS 7-2 connected to the VCS terminal 70-14, the CNU 21 connected to the AUX terminal 70-15, and the VCS 7-1 connected to the AUX terminal 70-16 respectively.

Under the two slots used for mounting the extended boards 10 are provided a reference terminal 36-1; a character terminal 36-2; an RS-232C terminal 36-3; and a power input terminal 36-4. The reference terminal 36-1 receives synchronous signals (reference signals) for synchronizing the CNU 1 with other devices. The character terminal 36-2 outputs video signals corresponding to the screens (FIG. 11 to FIG. 13) to be described later. In studio A shown in FIG. 1, the character terminal 36-2 is connected to the monitor 6. The RS-232C terminal 36-3 is connected to the RS-232C cable used for communicating with the computer used for controlling the CNU 1. The power terminal 36-4 is connected to a power cable for supplying an AC voltage used as a power supply.

Figure 6:
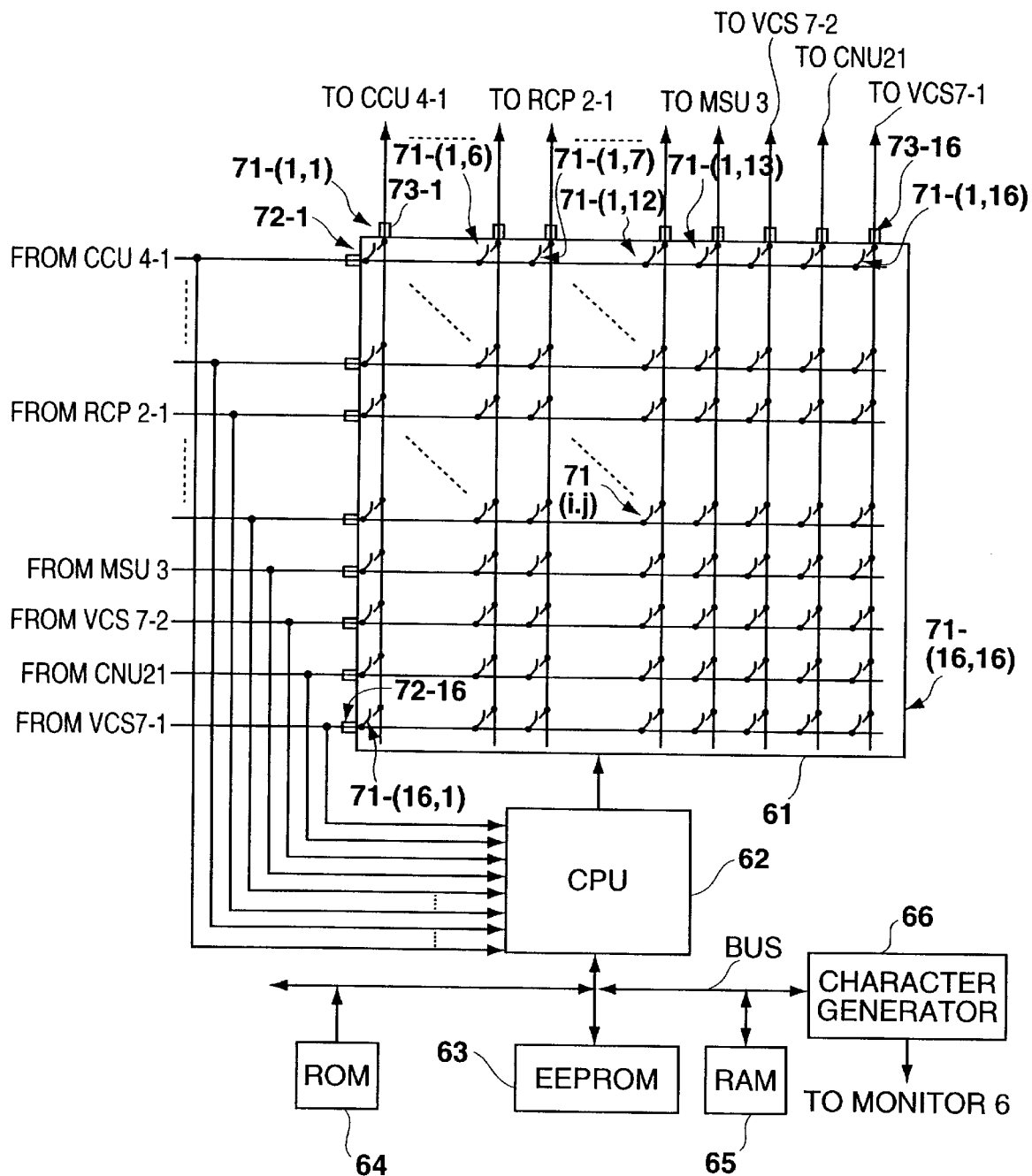
FIG. 6 is a block diagram of an electric configuration of the CNU 1 and 21 shown in FIG. 1.

FIG. 6 shows an electric configuration of the CNU 1.

The matrix switch 61 is provided with 16 input terminals comprising CCU input terminals 72-1 to 72-6; RCP input terminals 72-7 to 72-12; an MSU input terminal 72-13; a VCS input terminal 72-14; an AUX input terminal 72-15; and an AUX input terminal 72-16 and provided with 16 output terminals comprising CCU output terminals 73-1 to 73-6; RCP output terminals 73-7 to 73-12; an MSU output terminal 73-13; a VCS output terminal 73-14; an AUX1 output terminal 73-15; and an AUX2 output terminal 73-16. And, 256 (=$16^2$) switches 71-(1, 1) to 71-(16, 16) are provided as a matrix between each of the 16 input terminals 72-1 to 72-16 and each of the 16 output terminals 73-1 to 73-16. Those switches 71-(1, 1) to 71-(16, 16) are usually turned off and they are turned on according to the control data from the CPU 62. In the matrix switch 61, signals entered to input terminals are output only from the output terminals when the switches between those output terminals and input terminals are on.

The CPU 62 reads the data specifying the on/off state of each switch 71-($i, j$) ($i$=1, ..., 16, $j$=1, ..., 16) of the matrix switch 61 (hereinafter referred to as switch data) from, for example, a memory 63 comprising an EEPROM to control each switch 71-($i, j$) in the matrix switch 61 according to the switch data, and furthermore, the control data entered to the matrix switch 61 via input terminals 72-1 to 72-16 as needed.

In other words, the memory 63 stores switch data, that is, information representing a CCU that can communicate with the MSU 3 or 23, selected from the CCUs 4-1 to 4-3 connected to the CNU 1 (furthermore, selected from the video cameras 5-1 to 5-3 connected to the CCUs 4-1 to 4-3). The memory 63 stores switch data, that is, information representing whether the state of the CCU that can communicate with the MSU 3 or 23 can be changed (adjusted) according to the control data output from the MSU 3 or 23.

In this embodiment, control data is classified into change control data for requesting control of the contrast of CCUs and video cameras and a state change of the iris and master black of those devices and reference control data for requesting a reference to such the state.

In the case that switch data is set to disable the communication between the MSU 3 or 23 and, for example, the CCU 4-1 selected from CCUs 4-1 to 4-3, the CPU 62 controls the matrix switch 61 so that, for example, both change control data and reference control data from the MSU 3 or 23 are not transmitted to the CCU 4-1, as well as the state data from the CCU 4-1 is not transmitted to the MSU 3 or 23. In other words, since each switch 71-($i, j$) of the matrix switch 61 is usually off as described above, when the switch data is set to disable communications, the CPU 62 keeps the switch corresponding to the switch data in the off state.

In the case that switch data is set to enable the communication between the MSU 3 or 23 and the CCU 4-1 and enable the state to be changed, the CPU 62 controls the matrix switch 61 so that both change control data and reference control data from the MSU 3 or 23 are transmitted to the CCU 4-1, as well as the state data from the CCU 4-1 is transmitted to the MSU 3 or 23. In other words, the CPU 62 turns on the switch corresponding to between the MSU 3 or 23 and the CCU 4-1 only when control data is supplied from the MSU 3 or 23 and when state data is supplied from the CCU 4-1 in this case.

In the case that switch data is set to enable the communication between the MSU 3 or 23 and the CCU 4-1 but disable state changes, the CPU 62 controls the matrix switch 61 so that only the reference control data from the MSU 3 or 23 is transmitted to the CCU 4-1, as well as the state data from the CCU 4-1 is transmitted to the MSU 3 or 23.

Consequently, the following three cases can be specified in this embodiment; the CNU 1 enables transmission of both change control data and reference control data, the CNU 1 enables transmission of only reference control data, and the CNU 1 disables transmission of control data. Hereafter, such the specification of three types will be referred to as a control level as needed.

The memory 63 stores such switch data used to control the state of each switch 71-(*im j*) of the matrix switch 61. Switch data, as to be described after, is written in the memory 63 by the CPU 62 according to the specified signal from the MSU 3 (or MSU 23).

The ROM 64 stores programs used by the CPU 62 for various processings. The RAM 65 stores data necessary for operations of the CPU 62. The character generator 66 generates video signals corresponding to various screens under the control of the CPU 62 and supplies those signals to the monitor 6 (FIG. 1) so as to be displayed.

The CCU input terminals 72-1 to 72-6 and the CCU output terminals 73-1 to 73-6 shown in FIG. 6 correspond to the CCU terminals 70-1 to 70-6 shown in FIG. 5B, the RCP input terminals 72-7 to 72-12 and the RCP output terminals 73-7 to 73-12 shown in FIG. 6 to the RCP terminals 70-7 to 70-12 shown in FIG. 5B, the MSU input terminal 72-13 and the MSU output terminal 73-13 shown in FIG. 6 to the MSU terminal 70-13 shown in FIG. 5B, the VCS input terminal 72-14 and the VCS output terminal 73-14 shown in FIG. 6 to the VCS terminal 70-14 shown in FIG. 5B, the AUX1 input terminal 72-15 and the AUX1 output terminal 73-15 shown in FIG. 6 to the AUX terminal 70-15 shown in FIG. 5B, and the AUX2 input terminal 72-16 and the AUX2 output terminal shown in FIG. 6 to the AUX terminal 70-16 shown in FIG. 5B respectively.

Figure 7:
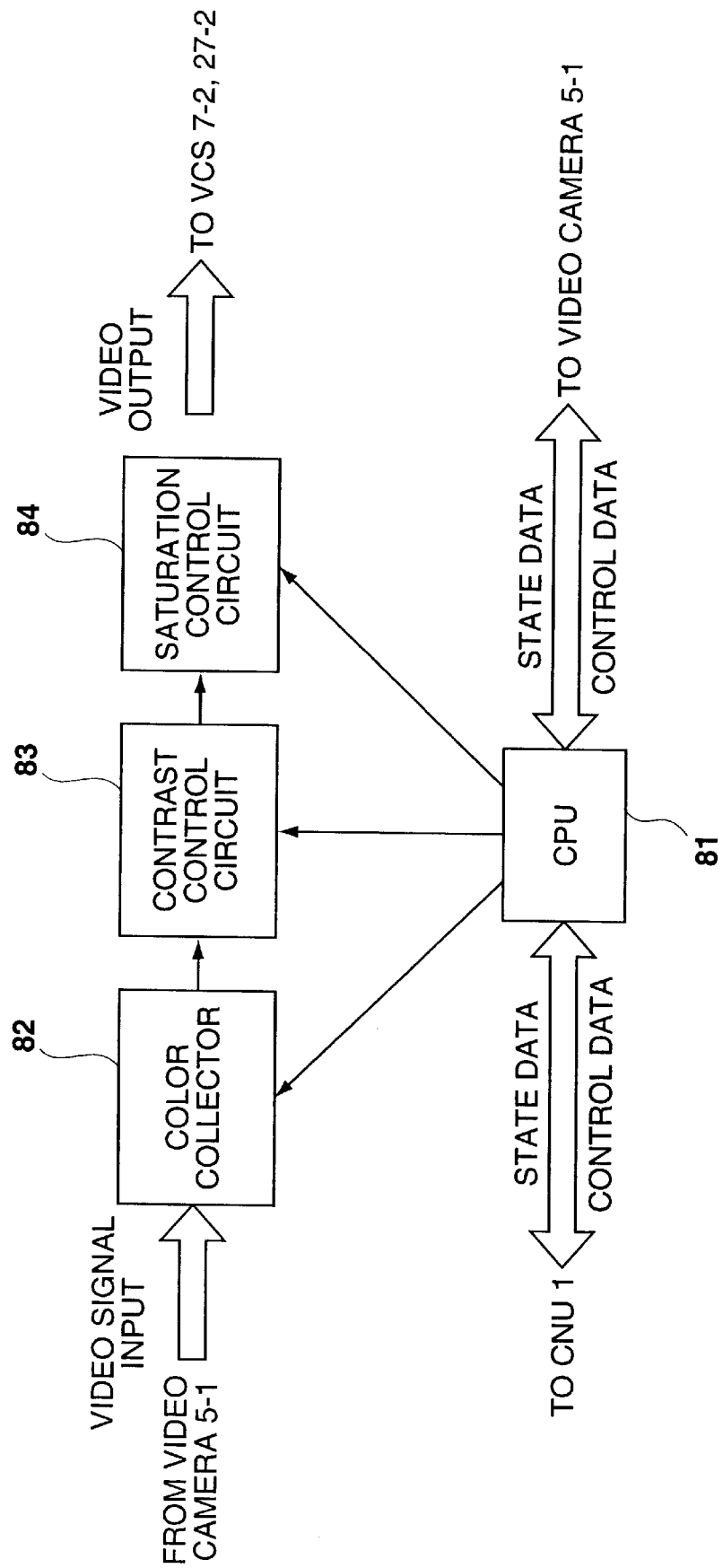
FIG. 7 is a block diagram of a configuration of the CCU 4-1 to 4-3 and 24-1 to 24-5 shown in FIG. 1.

Subsequently, FIG. 7 shows a configuration of the CCU 4-1 shown in FIG. 1. The configurations of the CCU 4-2 and 4-3, as well as the configuration of the 24-1 to 24-5 are all the same as that of the CCU 4-1.

The CPU 81 is supplied control data from the CNU 1. The CPU 81 receives such the control data. When control data received from the CNU 1 is addressed to the video camera 5-1 connected to itself, the CPU 81 transmits the control data to the video camera 5-1. When control data received from the CNU 1 is addressed to itself, the CPU 81 changes the adjustment volume for the color collect, contrast, or saturation in the color collector 82, the contrast control circuit 83, or the saturation control circuit 84 according to the control data. The CPU 81 then transmits the state data representing the adjustment volume of the changed color collect, contrast, or saturation to the CNU 1 or the CPU 81 recognizes the current volume of the adjustment of the color collect, contrast, or saturation and transmits the volume to the CNU 1 as the current state data.

The CPU 81 is also supplied state data from the video camera 5-1, so the CPU 81 receives the state data and transmits the data to the CNU 1.

The color collector 82 is supplied video signals from the video camera 5-1. The color collector 82 then collects colors according to the control data from the CPU 81 and supplies the signals to the contrast control circuit 83. The contrast control circuit 83 adjusts the contrast of the video signals from the color collector 82 according to the control data from the CPU 81 and supplies the result signals to the saturation control circuit 84. The saturation control circuit 84 adjusts the saturation of the video signals from the contrast control circuit 83 according to the control data from the CPU 81 and supplies the result signals to the VCSs 7-2 and 27-2.

Figure 8:
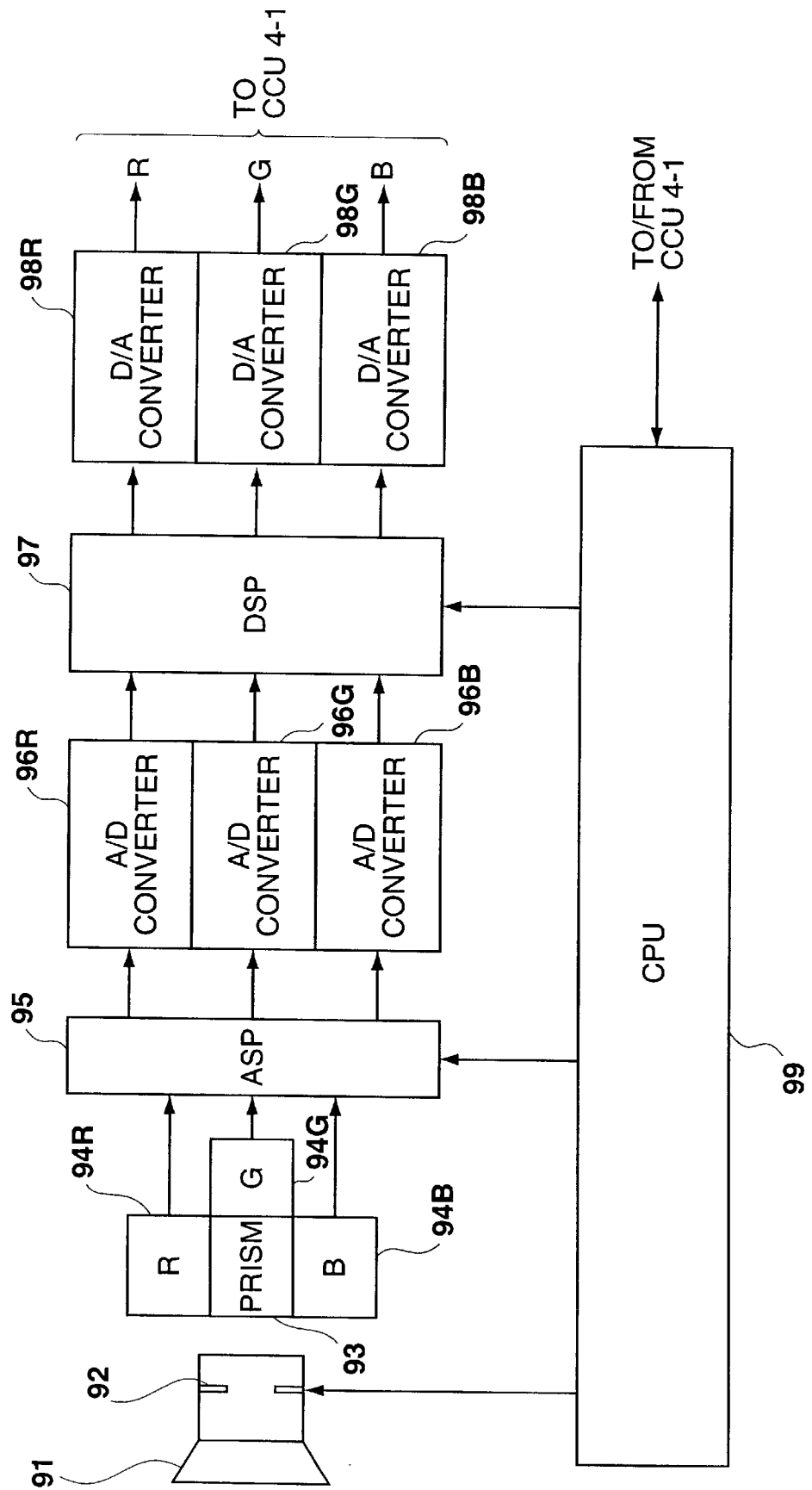
FIG. 8 is a block diagram of a configuration of the video camera 5-1 to 5-3 and 25-1 to 25-5 shown in FIG. 1.

Subsequently, FIG. 8 shows a configuration of the video camera 5-1 shown in FIG. 1. The configurations of the video cameras 5-2 and 5-3, as well as the configurations of 25-1 to 25-5 are the same as that of the video camera 5-1.

The lens block 91 condenses the light from an object on, for example, on the CCDs (Charge Coupled Device) 94R, 94G, and 94B as photoelectric conversion elements. In other words, the light from the lens block 91 passes through the iris 92, so the light volume is adjusted and entered to the prism 93. The prism 93 separates the light entered via the iris 92 into three components of R (Red), G (Green), and B (Blue) and outputs those components to the CCDs 94R, 94G, and 94B. Each of the CCDs 94R, 94G, and 94B converts the corresponding light of R, G, and B components into electric signals.

The R, G, and B signals obtained through the photoelectric conversion of the light comprising R, G, and B components entered to CCDs 94R, 94G, and 94B are all supplied to the analog signal processor 95. The analog signal processor 95 then carries out analog signal processings such as white level adjustment, etc. for the R, G, and B signals and supplies the results to the A/D converters 96R, 96G, and 96B respectively. The A/D converts 96R, 96G, and 96B convert the R, G, and B signals from analog to digital and supplies the digital R, G, and B signals to the DSP (Digital Signal Processor) 97. The DSP 97 carries out digital signal processings such as black level adjustment, etc. for the supplied R, G, and B signals, then supplies the adjusted digital signals to the D/A converters 98R, 98G, and 98B respectively. These D/A converters convert those digital R, G, and B signals to analog signals, then supplies the analog R, G, and B signals to the CCU 4-1 (color collector 82 (FIG. 7)).

The CPU 99 receives control data via the CCU 4-1 and changes the adjusting value for the light volume in the iris 92, the white level in the analog signal processor 95, or the black level in the DSP 97. Then, the CPU 99 transmits the state data representing the adjusted value of the iris, white level, or black level to the CNU 1 via the CCU 4-1 or the CPU 99 recognizes the current value of the adjustment of the iris, white level, or black level and transmits the results to the CNU 1 via the CCU 4-1.

Subsequently, how to set each switch 71-(*i, j*) of the matrix switch 61 used in the CNU 1 (FIG. 6) will be described.

Figure 9:
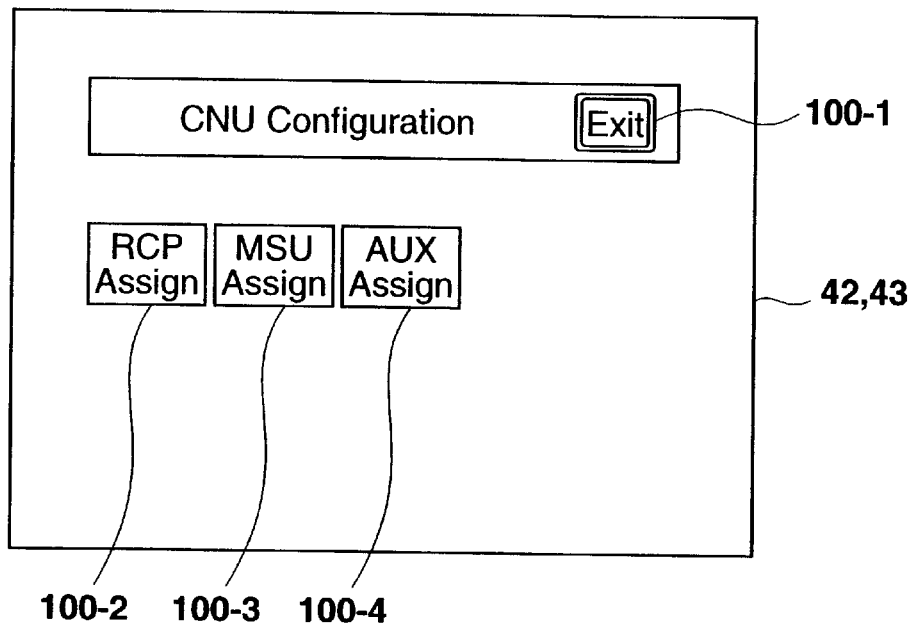
FIG. 9 is the menu screen.

When setting up the matrix switch 61, at first, the menu screen shown in FIG. 9 is displayed on the monitor 42 of the MSU 3 by operating the operation panel 44 of the MSU 3 (FIG. 2 and FIG. 3).

In FIG. 9, the menu screen comprises the characters of "CNU Configuration"; an "Exit" button 100-1 arranged on the right side of the characters; an "RCP Assign" button 100-2, an "MSU Assign" button 100-3, and an "AUX Assign" button 100-4 arranged under the characters. The "Exit" button 100-1 is pressed to exit the menu screen. The "RCP Assign" button 100-2 is pressed to specify a video camera (CCU) to be assigned to the RCP. (This "RCP Assign" button is used to assign an RCP selected from 2-1 and 2-3 to a video camera selected from 5-1 to 5-3 (CCU 4-1 to 4-3) on the screen.) The "MSU Assign" button 100-3 is pressed to specify a video camera (CCU) to be assigned to the MSU and specify the control level. The "AUX Assign" button 100-4 is used to specify devices to be assigned to the VCS terminal 70-14 and the AUX terminals 70-15 and 70-16 (FIG. 5).

When assigning a video camera (CCU) to and controlled by the MSU 3, as well as to specify a control level of the video camera, the "MSU Assign" button 100-3 on the menu screen is used. In this case, the MSU 3 (FIG. 3) controls the monitor 42 via the control circuit 45 so that the MSU assignment screen used for specifying a video camera to be assigned to the MSU 3 and specifying the control level of the video camera is displayed. With this, the monitor displays, for example, the MSU assignment screen as shown in FIG. 10.

Figure 10:
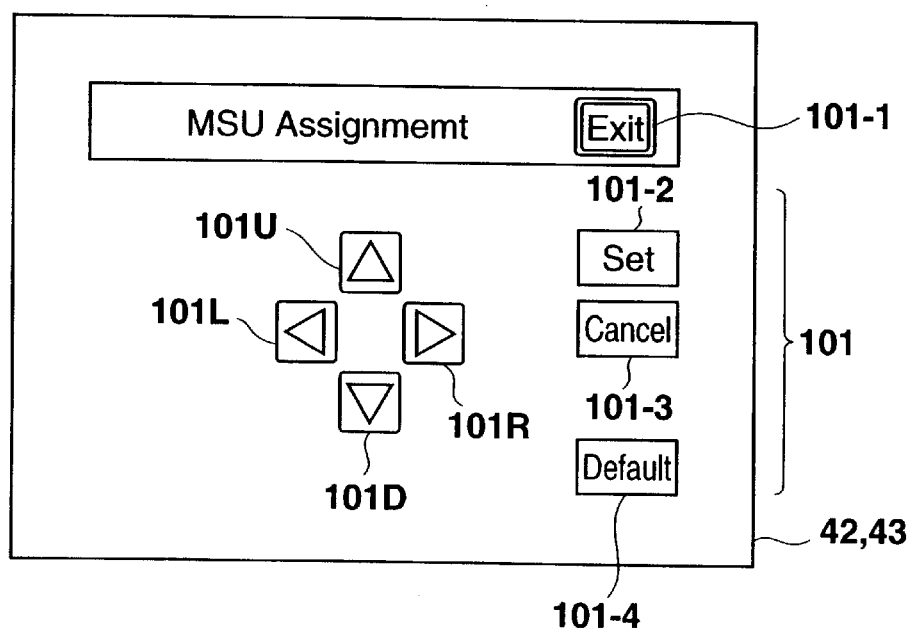
FIG. 10 is the MSU assignment screen.

In FIG. 10, the MSU assignment screen displays an "Exit" button 101-1 having the same function as that of the "Exit" button 100-1 shown in FIG. 9 and the following operation buttons 101; a "Set" button 101-2; a "Cancel" button 101-3; a "Default" button 101-4; and cursor keys 101U, 101D, 101L, and 10R. The "Set" button 101-2 is used to decide the item selected by the cursor 103 (positioned on the cursor 103) on the later described screen displays in FIG. 11 and FIG. 12. The "Cancel" button 101-3 is used to cancel a decided item. The "Default" button 101-4 is used to specify a selected item on the screen as a default item. The cursor key 101U, 101D, 101L, or 101R is used to move the cursor 103 vertically or horizontally.

Figure 11:
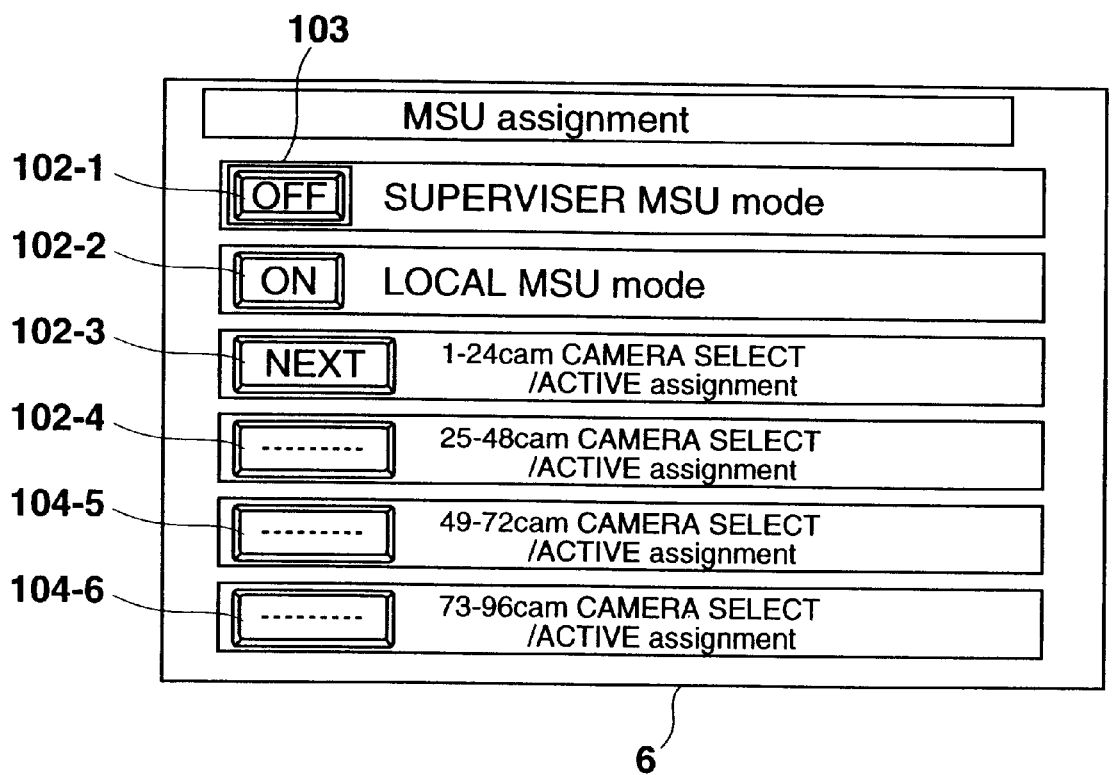
FIG. 11 is the mode selection screen.

The control circuit 45 displays the MSU assignment screen (FIG. 10) on the monitor 42, as well as controls the CNU 1 to display a screen for selecting a mode (hereinafter referred to as a mode selection screen as needed) specifying the MSU 3 control range (video cameras to be assigned to the MSU 3) as shown in FIG. 11 on the monitor 6. In other words, the mode selection screen is displayed on the monitor 6 when the CPU 62 in the CNU 1 (FIG. 6) controls the character generator 66 according to the control data from the control circuit 45.

The modes that can be selected on the mode selection screen are supervisor MSU mode and local MSU mode. When adjusting only a video camera (CCU) connected to a CNU using an MSU (when assigning controlling of a video camera connected to a CNU to which an MSU is connected directly to the MSU), more concretely, when adjusting only the video cameras 5-1 to 5-3 using the MSU 3 in studio A, the local MSU mode is selected. On the contrary, when adjusting a video camera connected to two or more CNUs respectively using an MSU (when assigning controlling of a video camera connected to a plurality of CNUs including the CNU to which the MSU is connected directly using an MSU), more concretely, when adjusting all the video cameras 5-1 to 5-3 and 25-1 to 25-5 in both studios A and B using the MSU 3, the supervisor MSU mode is selected.

In other words, in the case that the MSU 3 is set in the local MSU mode and the MSU 3 controls only the video cameras 5-1 to 5-3 in studio A, the cursor 103 is moved to the button 102-2 arranged on the left side of the "LOCAL MSU mode" characters on the mode selection screen (FIG. 11) using the cursor key 101U, 101D, 101L, or 101R, then the "Set" button 101-2 is pressed. In this case, the button 102-2 is displayed as "ON" as shown in FIG. 11 and the MSU 3 is set in the local MSU mode.

Figure 13:
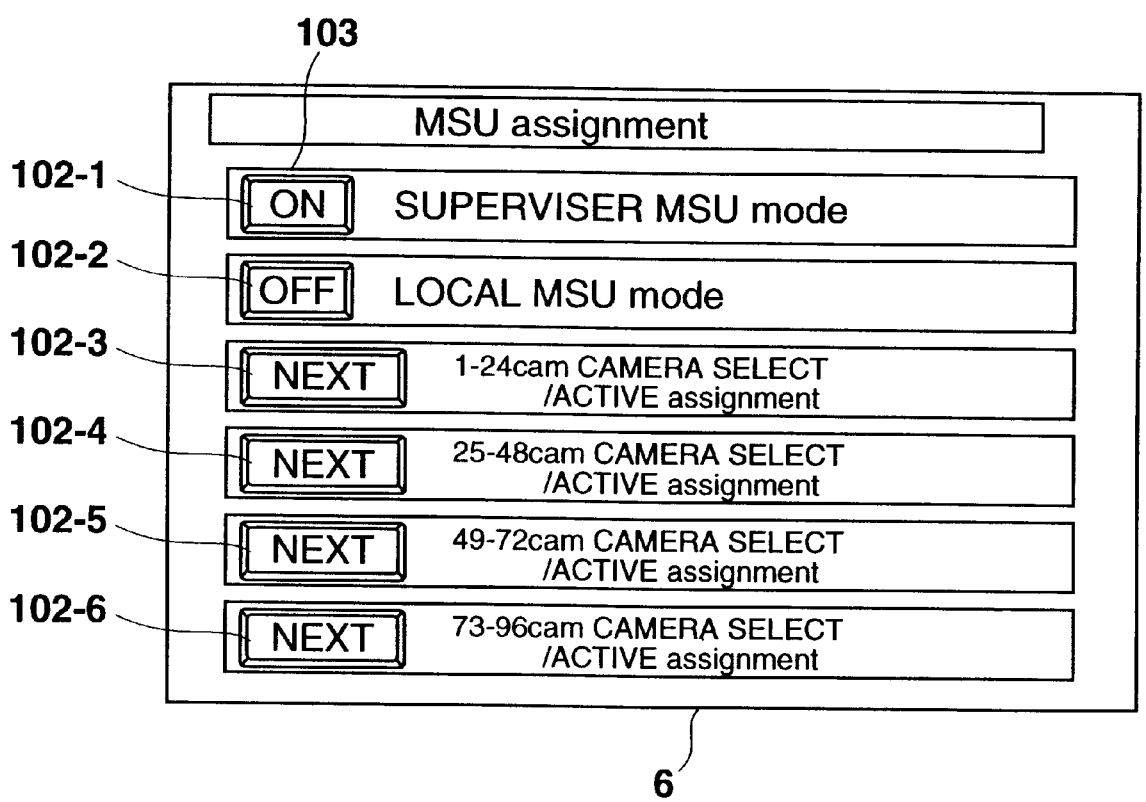
FIG. 13 is the mode selection screen.

In the case that the MSU 3 is set in the supervisor MSU mode and the MSU 3 is used to control all the video cameras 5-1 to 5-3 and 25-1 to 25-5 in both studios A and B, the cursor 103 is moved to the button 102-1 arranged on the left side of the "SUPERVISOR MSU mode" characters on the mode selection screen (FIG. 11) using the cursor key 101U, 101D, 101L, or 101R, then the "Set" button 101-2 is pressed. In this case, the state of the button 102-1 is displayed as "ON" as shown in FIG. 13 and the MSU 3 is set in the supervisor MSU mode.

In the case that the supervisor MSU mode is selected here, the state of the switch 102-1 is displayed as "ON" as described above, but the state of the switch 102-2 is displayed as "OFF". In the same way, in the case of that the local MSU mode is selected, the state of the switch 102-2 is displayed as "ON", but the state of the switch 102-1 is displayed as "OFF". Consequently, in the embodiment of this invention shown in FIG. 11, the local MSU mode is selected.

The MSU 3 and the monitor 6 connected to the CNU 1 are arranged closely to each other. Consequently, the user can move the cursor 103 displayed on the mode selection screen displayed on the monitor 6 to any desired position easily by using the cursor key 101U, 101D, 101L, or 101R.

In this embodiment, up to 24 video cameras (CCUs) can be assigned to the CNU. Thus, video cameras are assigned to an MSU in units of 24.

In other words, on the mode selection screen shown in FIG. 11, each of the buttons 102-3 to 102-6 is arranged on the left side of its corresponding display of "1–24cam CAMERA SELECT/ACTIVE assignment", "25–48cam CAMERA SELECT/ACTIVE assignment", "49–72cam CAMERA SELECT/ACTIVE assignment", and "73–96cam CAMERA SELECT/ACTIVE assignment". The buttons 102-3 to 102-6 are used to set control levels for the first to 24th video cameras (1CAM to 24CAM), the 25th to 48th video cameras (25CAM to 48CAM), and the 73rd to 96th video cameras (73CAM to 96CAM).

As described above, since the CNU 1 can connect only 24 video cameras, only 24 video cameras, that is, the first to 24th video cameras in maximum, can be assigned to the MSU 3 in the local MSU mode. Consequently, the control levels can also be set for the first to 24th video cameras and cannot be set for the 25th to 96th video cameras. To notify this on the mode selection screen shown in FIG. 11, only the button 102-3 corresponding to the first to 24th video cameras are displayed as "NEXT", and the buttons 102-4 to 102-6 corresponding to the other video cameras is displayed as ". . . ".

When setting a control level for each video camera to be assigned to the MSU 3 in the local MSU mode, the cursor 103 is moved to the button 102-2 for which "NEXT" is displayed by operating the cursor key 101U, 101D, 101L, or 101R, then the "Set" button 101-2 is pressed.

In this case, the control circuit 45 of the MSU 3 controls the CNU 1 to display the screen for setting control levels of the first to 24th video cameras (1CAM to 24CAM) (hereinafter referred to as the control level setting screen). In the AV processing system shown in FIG. 1, 3 video cameras 5-1 to 5-3 are provided in studio A and connected to the CNU 1. And, "1CAM" to "3CAM" shown in FIG. 12 correspond to those video cameras 5-1 to 5-3.

After the control level setting screen is displayed on the monitor 6, the operation button 101 (using the cursor key 101U, 101D, 101L, or 101R) displayed on the monitor 42 of the MSU 3 is pressed to move the cursor 103 on the control level setting screen to the item corresponding to the target video camera (any of 1CAM to 24CAM) to which a control level is to be set.

While the cursor 103 is positioned on the selected item "Camera Select", the "Set" button 101-2 displayed on the monitor 42 of the MSU 3 is pressed. Then, each time the "Set" button is pressed, the display color (and the display color of the item "Active/Parallel") of the item "Camera Select" is changed alternately between reverse video and normal video. In the case that transmission of neither change control data nor reference control data is enabled for the corresponding video camera (thus, the MSU 3 is not enabled to control the video camera), the item "Camera Select" is displayed in the reverse video. In the case that transmission of either change control data or reference control data is enabled, the item "Camera Select" is displayed in the normal video.

In the case that the item "Camera Select" is displayed in the reverse video, and accordingly, transmission of neither change control data nor reference control data is enabled for the video camera (CCU) (when the MSU 3 is not enabled to control the video camera), it is no need to set a control level for the video camera specially after that.

In the case that the item "Camera Select" is displayed in the normal video and transmission of either change control data or reference control data is enabled for the video camera, the cursor 103 is moved to the item "Active/Parallel" making a pair with (arranged under) "Camera Select" displayed in the reverse video (CCU) (when the MSU 3 is not enabled to control the video camera).

In the case that transmission of only reference control data is enabled for the video camera (CCU), that is, when reading of the state data from the video camera is enabled and a control level is set for disabling state changes, the item "Active/Parallel" is displayed in the reverse video.

In the case that transmission of both change control data and reference control data is enabled for the video camera (CCU), that is, when a control level is set so that both state change of the video camera and reading of the state data from the video camera are enabled, the item "Active/Parallel" is displayed in the normal video.

Figure 12:
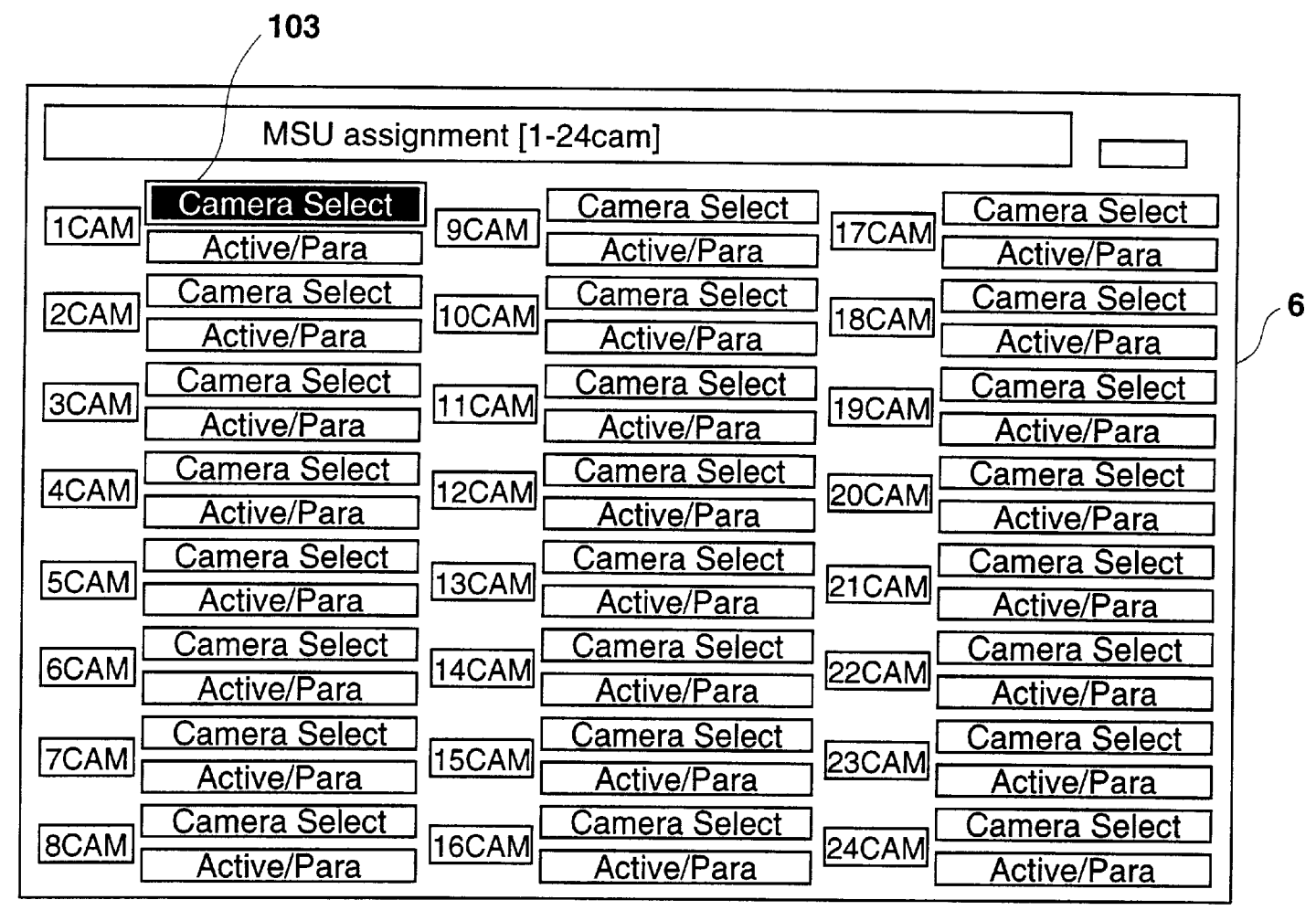

For example, in the case that transmission of neither change control data nor reference control data is enabled for the video camera 5-1, the item "Camera Select" of "1CAM" is displayed in the reverse video as shown in FIG. 12. With this, transmission of both change control data and reference control data to the video camera from the MSU 3, that is, the state change of the video camera 5-1 and reading the state data from the video camera are both restricted.

In other words, the signal corresponding to the setting of control level described above is supplied to the CPU 62 of the CNU 1 from the MSU 3. In correspondence to the signal, the CPU 62 updates the switch data stored in the memory 63 so that the switch 71-(l, 13) and the switch 71-(13, 1) provided between the MSU 3 and the CCU 4-1 corresponding to the video camera 5-1 are turned off (so as not to be turned on).

Concretely, for example, the switch data indicating that the MSU 3 cannot change the status of the video camera 5-1 (CCU 4-1) nor reference to the state of the video camera 5-1 (CCU 4-1) used as an AV device is saved in the memory 63.

When such the setting is made, control data output from the MSU 3 is not supplied to the CCU 4-1 from the CNU 1 even when the video camera 5-1 is selected in the MSU 3 by pressing the "Camera Select" button 44-3 (FIG. 2) as described above.

A control level is preset for each of the video cameras arranged in the studio such way. "Para" of the item "Active/Para" shown in FIG. 12 indicates the parallel mode described above.

In the case that the supervisor MSU mode is selected for the MSU 3 shown in FIG. 11, the cursor 103 is moved to the button 102-1 on the left side of "SUPERVISOR MSU mode" and the "Set" button 101-2 is pressed. In this case, as shown in FIG. 13, the button 102-1 is displayed as "ON" and the button 102-2 is displayed as "OFF" on the mode selection screen.

Also in this case, a signal indicating that the supervisor mode is selected is supplied to the CPU 62 of the CNU 1 from the MSU 3. In correspondence to the signal, the CPU 62 updates the switch data stored in the memory 63 so that the switches 71-(13, 15) and 71-(15, 13) connected to the MSU 3 and the CNU 21 in studio B are turned on.

In other words, when the supervisor MSU mode is selected, the CNU 1 is connected to the CNU 21 electrically.

By changing over the MSU mode between local MSU mode and supervisor MSU mode such way, the video cameras controlled by the MSU 3 (video cameras whose controls are assigned to the MSU 3) can be changed easily.

The CNU 1 is also connected to the CNU 21 electrically even when the supervisor MSU mode is selected in the MSU 23 in studio B.

In the case that the supervisor MSU mode is selected, the control levels of the video cameras 25-1 to 25-5 connected to the other CNU 21 (via the CCUs 24-1 to 24-5) are set in the same way as when the local MSU mode is selected.

In this embodiment, one MSU can control video cameras connected to other 3 units of CNU in maximum, that is, 4 units of CNU in total including the CNU to which the MSU is connected directly, in the supervisor MSU mode. (For example, up to 96 video cameras can be assigned to the MSU 3.) Since up to 24 video cameras can be connected to one CNU as described above, a total of 96 video cameras (first to 24th, 25th to 48th, 49th to 72nd, and 73rd to 96th) can be connected to 4 units of CNU in maximum. Consequently, since control levels might be set not only for the first to 24th video cameras, but also for the 25th to 96th video cameras in the supervisor MSU mode just like in the local MSU mode, "NEXT" is displayed for the button 102-3 corresponding to the first to 24th video cameras, but also for the button 102-4 to 102-6 corresponding to the 25th to 48th, the 49th to 72nd, or the 73rd to 96th video cameras on the mode selection shown in FIG. 13, on which the supervisor MSU mode is selected. The number of CNU units connected to each other and the number of video cameras that can be connected to one CNU may be changed from the values described above.

In this case, the cursor 103 is moved to the button 102-4 on the left side of "25–48cam CAMERA SELECT . . . " on the screen shown in FIG. 13 using the cursor key 101-U, 101D, 101L, or 101R displayed on the monitor 42 of the MSU 3 and the "Set" button 101-2 is pressed, so that the control level setting screen is displayed for the 25th to 48th video cameras just like the screen shown in FIG. 12. Then, control levels are set for the video cameras 25-1 to 25-5 (25CAM to 29CAM) just like in the local MSU mode.

When control levels are set for the video cameras 25-1 to 25-5 connected to another CNU 21 such way, the signal corresponding to the setting is supplied to the CPU 62 of the CNU 21 from the MSY 3 via the CNU 1. In correspondence to the signal, the CPU 62 of the CNU 21 writes the switch data associated with the state of the switch 71-($i, j$) between the CNU 1 and the CCU 24-m making a pair with the video camera 25-m (m=any of 1 to 5) in the memory 63 of the CNU 21.

Control levels (any of the states of enabling state changes of the object AV device and reading of the state, enabling reading of the state, and disabling both state change and reading of the state) are set for video cameras assigned to the MSU 3 according to the selected mode (local MSU mode or supervisor MSU mode) as described above.

After such a control level setting, when the operation panel 44 ("Camera Select" button 44-3) of the MSU 3 is operated, the target video camera 5-k (k=any of 1 to 3) is selected. When the operation panel 44 is further operated, the control data for the selected video camera 5-k is supplied to the CNU 1 from the control circuit 45. Then, the CNU 1 controls the switches 71-(13, k) and 71-(k, 13) in the CPU 62 corresponding to the preset control level.

In the case that any of the video cameras 25-1 to 25-5 connected to the CNU 21 (via the CCU 24-1 to 24-5) is selected in the supervisor MSU mode and the control data for the selected video camera 25-k (k=any of 1 to 5) is supplied to the CNU 1 from the control circuit 45 of the MSU 3, the CPU 62 of the CNU 1 outputs the control data from the MSU 3 to the CNU 21 as is via the matrix switch 61. Then, the CNU 21 controls the object switch corresponding to the preset control level.

Figures 14A, 14B, 14C:
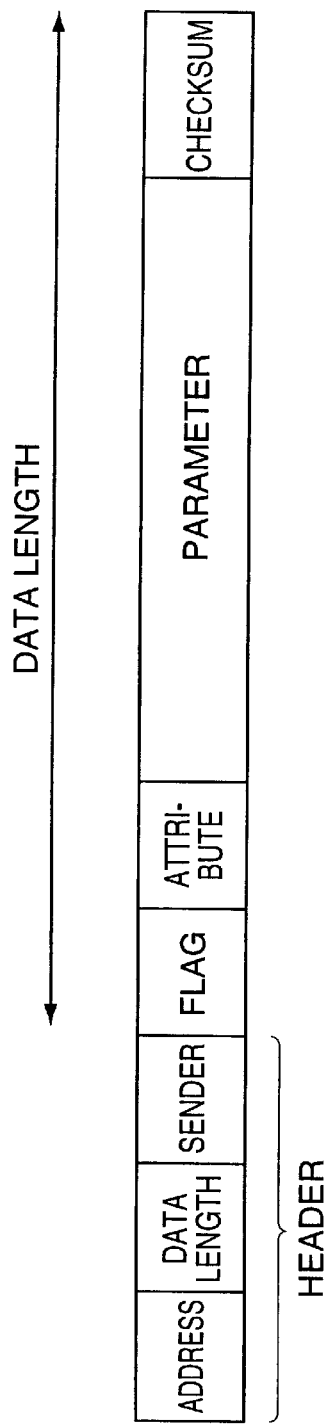
FIGS. 14A to FIG. 14C show the formats of control data and state data.

FIG. 14A to FIG. 14C show the formats of the control data output from the MSUs 3 and 23 and the state data output from the CCUs 4-1 to 4-3 and 24-1 to 24-5, as well as from the video cameras 5-1 to 5-3 and 25-1 to 25-5. In this embodiment, both control data and state data are assumed to use the same format.

As shown in FIG. 14A, control data (state data) is roughly divided into 5 items; header, flag, attribute, parameter, and checksum, which are arranged sequentially in order.

The header comprises address; data length; and sender. In other words, each device of the AV processing system shown in FIG. 1 is assigned a unique ID. The address has the ID of the destination device from which control data (or state data) is transmitted. For example, 70H is assigned to an MSU, 40H to a CCU, and 20H to a video camera respectively. (H indicates that the number put before it is hexadecimal.) The data length means a data length from the start of the flag to the end of the checksum represented in bytes. The transmitter is assigned the ID of the object AV device from which control data (state data) is to be transmitted.

The flag is assigned information indicating whether the parameter value (to be described later) is relative or absolute. The attribute is assigned a value indicating the object to be controlled (e.g. iris, white balance, etc. in a video camera). The parameter is assigned the value for adjusting the control object (e.g. iris, white balance adjustment value of R signal, etc. of a video camera) and the checksum is assigned a checksum found for control data.

In this embodiment, both control data and state data use the same format as described above, but a flag can be used to distinguish control data from state data. In other words, in this embodiment, when changing the state of a video camera, the change value (a relative value for increasing/ decreasing from the current value) is set in the parameter. When notifying the state of itself, the state absolute value is set in the parameter. Concretely, when an MSU changes the adjustment value of the iris of a video camera, a value indicating the difference from the current value is assumed as the parameter. When a video camera notifies an MSU of the adjustment value of the iris, a value corresponding to the adjustment value itself is assumed as the parameter. In the case that a relative or absolute value is set in a parameter, the information is set in the flag. Thus, control data and state data can be distinguished from the other by referencing the flag.

Furthermore, in this embodiment, a CCU or video camera that receives control data (for which the flag in the data formatted as shown in FIG. 14A indicates that the parameter value is relative) sends back state data (for which the flag in the data formatted shown in FIG. 14A indicates that the parameter value is absolute) to the MSU that has transmitted the control data as a response.

For example, when the control data (change control data) as shown in FIG. 14B is transmitted to a video camera in an MSU, the video camera changes its state according to the control data and sends back the updated state data as shown in FIG. 14C to the MSU.

In this case, 20H set for the address in FIG. 14B indicates the ID of the video camera, 05H set for the data length indicates the number of bytes used from the start of the flag to the end of the checksum, and 70H set for the sender indicates the ID of the MSU respectively. 22H set for the flag indicates that the parameter is an analog relative value and 01H set for the attribute indicates the iris. Thus, the control data is transmitted from the MSU to the video camera, requesting that the adjustment value of the iris is increased by 0001H from the current value.

On the other hand, 70H set for the address in FIG. 14C indicates the ID of the MSU, 05H set for the data length indicates the number of bytes used from the start of the flag to the end of the checksum, and 20H set for the sender indicates the ID of the video camera respectively. 23H set for the flag indicates that the parameter is an analog absolute value and 01H set for the attribute indicates the iris. Consequently, this state data is transmitted to the MSU from the video camera, notifying that the adjustment value of the iris is 0701H.

In other words, a video camera that receives the control data as shown in FIG. 14B increases the adjustment value for the iris by 0001H from the current value. Thus, the updated iris adjustment value 0701H is set in the parameter in the control data instead of 0001H. Furthermore, both address 20H and sender 70H in the control data are updated respectively. Then, the flag value is changed from 22H indicating a relative value to 23H indicating an absolute value and the data is sent back as the updated state data.

In the embodiment shown in FIG. 14, the iris adjustment value is increased by 0001H from the original value, so that the updated value becomes 0701H. Thus, it is found that the original value is 0700H.

As described above, however, the parameter in the control data is a relative value in this embodiment and the video camera or CCU that has received the control data sends back the state data. Thus, control data in which the parameter is a value other than 0000H becomes change control data and control data in which the parameter value is 0000H becomes reference control data. In other words, the video camera or CCU that has received the control data changes the current state by the value corresponding to the parameter and sends back the state data in which the updated parameter value is set. Consequently, in the case that the parameter value is 0000H in control data, the current state is changed by 0 and the video camera or CCU sends back the updated value, that is, state data in which a value representing the original state is set in the parameter.

In FIG. 14, the parameter is represented by two bytes and each of other items is represented by one byte. For example, the parameter changes the data length according to the attribute. (The parameter length is variable.) At first, the CNU 1 processing will be described more in detail with reference to the flow charts in FIG. 15 and FIG. 16.

Figure 15:
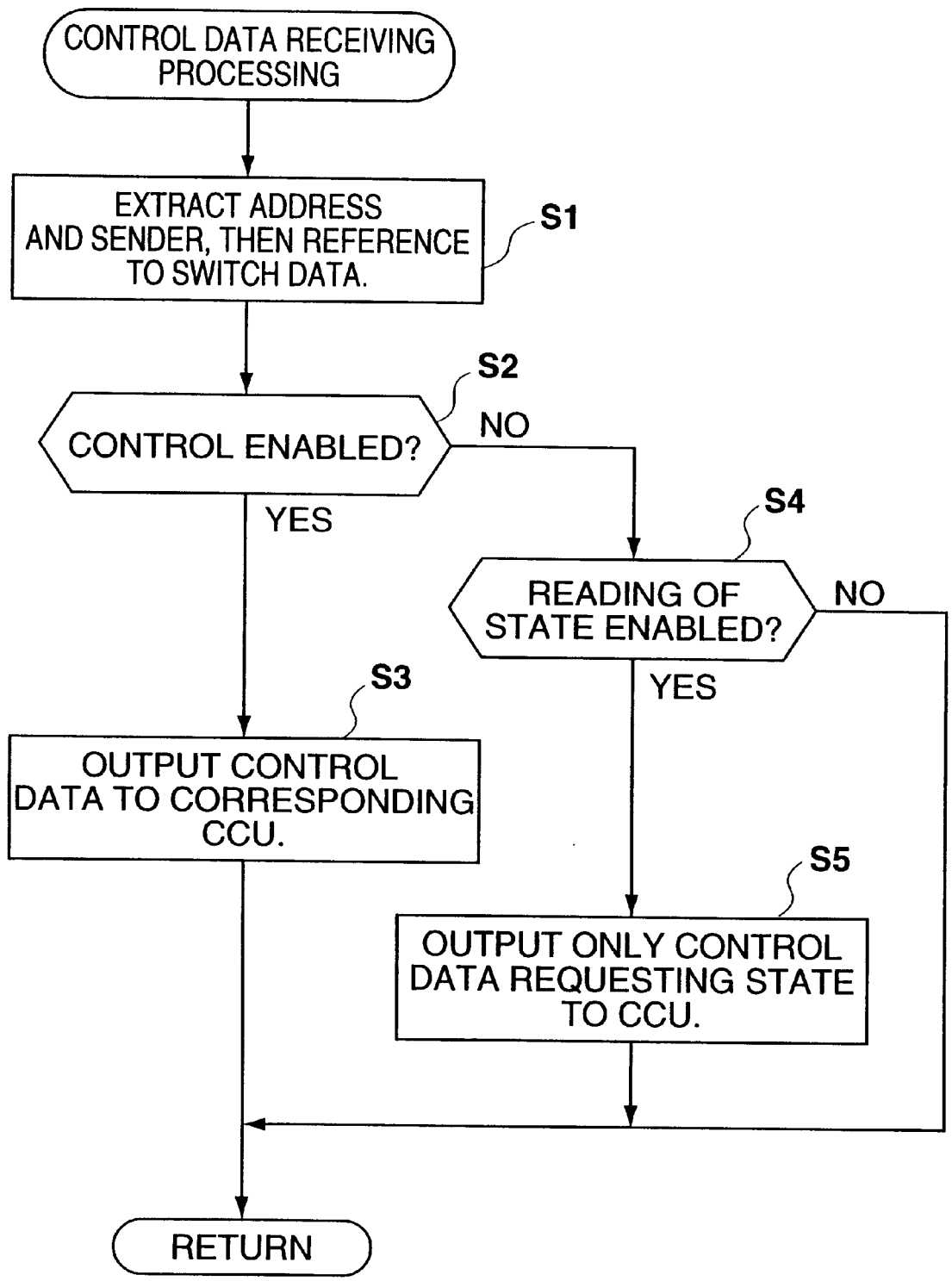
FIG. 15 is a flow chart for the processing of the CPU 62 shown in FIG. 6 for received control data.
Figure 16:
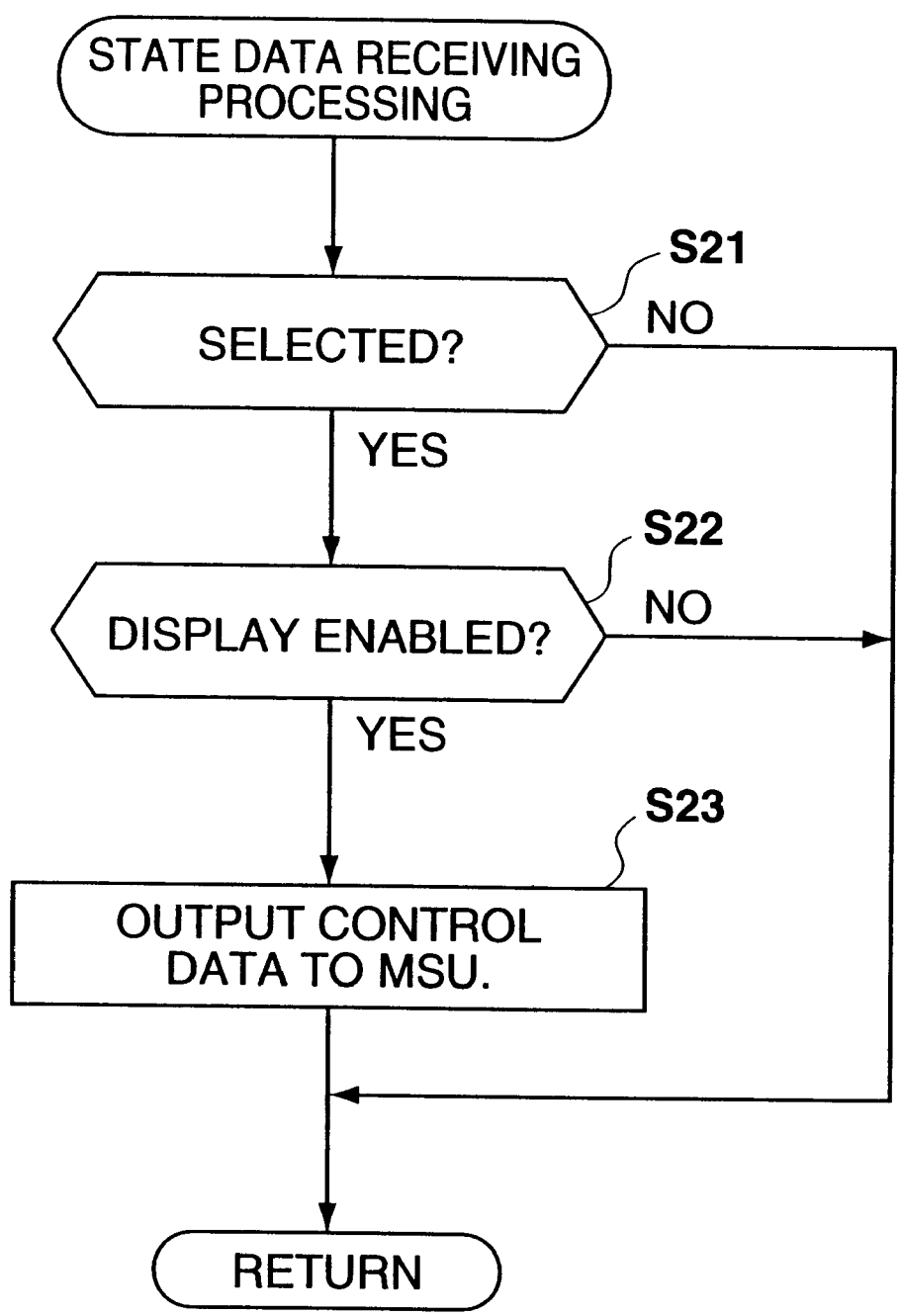
FIG. 16 is a flow chart of the processing of the CPU 62 shown in FIG. 6 for received state data.

Hereunder, how control data is received and processed in the CNU 1 (FIG. 6) will be described with reference to FIG. 15.

For example, the MSU 3 outputs control data for the video camera 5-k or 25-k (or CCU 4-k or 24-k) selected by pressing the "Camera Select" button 44-3 to the CNU 1, the control data is received by both the matrix switch 61 and the CPU 62.

Receiving control data, the CPU 62 extracts the address and sender (MSU 3) from the control data in step S1 to reference to the switch data stored in the memory 63. Then, the CPU 62 goes to step S2 to compare the address and sender extracted in step S1 with the switch data to determine whether transmission of change control data from sender to address is enabled or not (whether state changes of the receiver from the sender is enabled or not).

In the case that it is detected that transmission of change control data from sender to receiver is enabled in step S2, the CPU 62 goes to step S3 and controls the matrix switch 61 to turn on the switch for outputting control data from the terminal corresponding to the sender to the terminal corresponding to the address (receiver) and ends the processing. And accordingly, the control data supplied to the matrix switch 61 is transmitted (output) to the addressed CCU or video camera.

In other words, when the control data is addressed, for example, to the video camera 5-k in this case, the control data is output to the CCU 4-k making a pair with the video camera 5-k, and output further to the video camera 5-k via the CCU 4-k.

In the case that the control data is addressed, for example, to the video camera 25-k, the control data is output to the CNU 21 to which the video camera 25-k (CCU 24-k) is connected in the CNU 1. And, the CNU 21, receiving the control data, processes the control data shown in FIG. 15. This is a case in which the MSU 3 is set in the supervisor MSU mode and the switch 71-(13, 15) between the MSU 3 and the CNU 21 is turned on. In the case that the MSU 3 is set in the local MSU mode, the switch 71-(13, 15) between the MSU 3 and the CNU 21 is turned off, so control data is not output from the CNU 1 to the CNU 21.

On the other hand, in the case that it is detected that transmission of change control data from sender to address is enabled, the CPU 62 goes to step S4 to compare the sender and the address extracted in step S1 with switch data to determine whether transmission of reference control data from sender to address is enabled (whether the state of the addressed device can be referenced from the sender).

In the case that it is detected that reference control data can be transmitted from sender to address in step S4, the CPU 62 goes to step S5 to control the matrix switch 61 to turn on the switch for outputting control data from the terminal corresponding to the sender to the terminal corresponding to the address. Furthermore, in the case that the parameter value in the control data supplied to the matrix switch 61 is not 0000H, the CPU 62 changes the parameter value to 0000H. In other words, when the control data supplied to the matrix switch 61 is change control data, the CPU 62 changes the control data to reference control data and transmits (outputs) the data to the CCU or video camera specified by the address, ending the receiving processing.

In other words, when transmission of reference control data from sender to address is enabled and transmitted control data is reference control data, the control data is transmitted to the address as is. In the case that the transmitted control data is change control data, the control data is changed to reference control data and transmitted to the address. As a result, when transmission of change control data from sender to address is not enabled and transmission of only reference control data is enabled, actual transmission of change control data is restricted.

In step S4, it is detected whether transmitted control data is reference control data before detecting that transmission of reference control data from sender to address is enabled. In the case that the control data is not reference control data, that is, when the data is change control data, transmission of the control data can also be suppressed.

On the other hand, in the case that it is detected that transmission of reference control data from sender to address is enabled, the CPU 62 ends the processing without controlling the matrix switch 61. In other words, the switch 71-($i, j$) of the matrix switch 61 is turned on only when controlled by the CPU 62 as described above. Usually, the switch 71-($i, j$) is kept off. Consequently, in the case that the CPU 62 does not control the matrix switch 61, the switch 71-($i, j$) is kept off, so the control data supplied to the matrix switch 61 is not transmitted.

Transmission of control data to addresses is controlled (restricted) such way according to the switch data stored in the memory 63 according to preset control levels.

As described above, the video camera or CCU that has received control data via the CNU 1 transmits state data to the CNU 1 in response to the control data. Subsequently, how the CNU 1 receives and processes the state data will be described with reference to the flow chart shown in FIG. 16.

For example, in the case that the MSU 3 transmits control data to the video camera 5-k or 25-k (or CCU 4-k or 24-k) selected by operating the "Camera Select" button 44-3 via the CNU 1 and the CNU 1 receives state data in response to the control data. In this case, the state data is received by both the matrix switch 61 and the CPU 62 just like the control data shown in FIG. 15.

Receiving state data, the CPU 62 extracts address and sender from the state data in step S21 to determine whether the extracted sender is selected at the extracted address correctly. In other words, the address is an MSU 3 and a sender is the video camera 5-k or 25-k in this case. (In this case, however, when the sender is a video camera 25-k, the MSU 3 must be set in the supervisor MSU mode.) Consequently, it is detected in step S21 whether a video camera 5-k or 25-k is selected as the sender in the MSU 3.

In the case that it is detected in step S21 that the video camera 5-k or 25-k is not selected as a sender in the MSU 3, that is, when the video camera 5-k or 25-k is not selected as a sender by operating the "Camera Select" button 44-3, the CPU 62 ends the processing without controlling the matrix switch 61. In this case, since all the switches 71-($i, j$) of the matrix switch 61 are kept off as described above, the state data sent back from the video camera 5-k or 25-k, which is a sender, is not transmitted to the MSU 3.

The reason why the state data is not transmitted to the MSU 3 unless the video camera 5-k or 25-k is selected as a sender of state data in the MSU 3 is as shown below.

Sometimes, a video camera will transmit its setup state to the MSU 3 even when it is not requested after an auto setup is executed, for example, just after the power is turned on. Furthermore, in other cases, the video camera will transmit state data not requested by MSU 3 to MSU 3. And, the state data is displayed on the monitor of MSU 3 (to be described later). In the case that it is set so that video cameras that are not selected in MSU 3 should transmit state data to MSU 3, state data may be transmitted from many video cameras to MSU 3 at the same time and the MSU 3 monitor display will change frequently corresponding to lots of such state data. Under such the circumstances, the MSU 3 operator will not be able to understand the state of the desired video camera. In order to prevent such a trouble, transmission of state data is suppressed when the video camera 5-k or 25-k, which is a sender of state data, is not selected in MSU 3.

On the other hand, in the case that it is detected that the video camera 5-k or 25-k, which is a sender of state data, is selected in MSU 3, that is, when the video camera 5-k or 25-k is selected as a sender of state data by pressing the "Camera Select" button 44-3, the CPU 62 goes to step S22 to judge whether transmission of control data (both change control data and reference control data or transmission of only reference control data) from address to sender is enabled with reference to the switch data saved in the memory 63.

In the case that it is detected in step S22 that transmission of control data from address to sender is not enabled, the CPU 62 ends the processing without controlling the matrix switch 62. In other words, when transmission of control data from address to sender is not enabled, transmission of state data from sender to address is also not enabled in this embodiment. Consequently, for example, in the case that transmission of control data from an MSU 3 to a video camera 5-k or 25-k is not enabled, the state data transmitted from the video camera 5-k or 25-k is not transmitted to the MSU 3 even when it is addressed to the MSU 3. Even in such a case, however, it is possible to specify so that the state data is transmitted to the MSU 3.

On the other hand, in the case that it is detected in step S22 that transmission of control data (both change control data and reference control data or only reference control data) from address to sender is enabled, the CPU 62 goes to step S23 to control the matrix switch so that state data is transmitted from sender to address, then ends the processing.

Such way, the state data transmitted from the video camera 5-k or 25-k is transmitted to the MSU 3 in the CNU 1.

Receiving state data, the MSU 3 (FIG. 2) instructs, for example, the iris display unit 44-6 and the master black display unit 44-8 to display the value corresponding to the parameter.

The object video camera (CCU) to be assigned to the MSU 3 (or the MSU 23) can be changed easily such way. In other words, it is possible to select only the video cameras 5-1 to 5-3 (and CCU 4-1 to 4-3) installed in studio A for controlling and to select all of the video cameras 5-1 to 5-3 (and CCU 4-1 to 4-3) and 25-1 to 25-5 (and CCU 24-1 to 24-5) installed in both studio A and studio B for controlling easily. Furthermore, a control level can also be set for each of those video cameras at that time, the controllability of the MSU 3 can be improved significantly.

Subsequently, how the CCU 4-1 (or CCUs 4-2, 4-3, and 24-1 to 24-5) receives and processes control data will be described with reference to the flow chart shown in FIG. 17.

It is assumed here that control data is transmitted to the CCU 4-1 or the video camera 5-1 connected to the CCU 4-1.

In the CCU 4-1 (FIG. 7), control data transmitted from the CNU 1 is received by the CPU 81. The CPU 81 then references to the address in the control data in step S31 and detects whether the control data is addressed to itself. In the case that it is detected in step S31 that the control data is not addressed to itself, that is, the address in the control data is 20H, which is the ID of a video camera, thus addressed to the video camera, then the CPU 81 goes to step S32 to transmit the received control data to the video camera (video camera 5-1 in this case) connected to itself, ending the processing.

In the case that it is detected in step S31 that the control data is addressed to itself, that is, when the address in the control data is 40H, which is the ID of a CCU, then the CPU 81 goes to step S33 and detects whether the control data is change control data. In the case that the control data is detected to be change control data in step S33, the CPU 81 goes to step S34 and changes the state of the CCU 4-1 corresponding to the change control data. In other words, the CPU 81 changes the adjustment volume of the color collect, contrast, or saturation by the parameter value in the change control data by controlling the color collector 82, the contrast control circuit 83, or the saturation control circuit 84.

Going to step S35, the CPU 81 sends back the state data and ends the processing. In other words, the CPU 81 recognizes the adjustment value updated according to the received change control data and sets the value as the parameter of the received change control data. Furthermore, the CPU 81 replaces both address and sender in the received change control data and changes the flag to the one representing an absolute value and calculates the checksum. Then, the CPU 81 transmits the change control data updated such way to the CNU 1 as state data.

On the other hand, in the case that the control data is detected not to be change control data, that is, when the control data is reference control data, then the CPU 81 skips step S34 and goes to step S35 to send back state data and ends the processing. In other words, the CPU 81 recognizes the adjustment value (e.g. current adjustment value of color collect, contrast, or saturation) corresponding to the attribute in the received control data and sets the value as the parameter in the reference control data. Furthermore, the CPU 81 updates both address and sender in the received reference control data and changes the flag to the one representing an absolute value and calculates the checksum. Then, the CPU 81 transmits the reference control data updated such way to the CNU 1 as state data.

Figure 18:
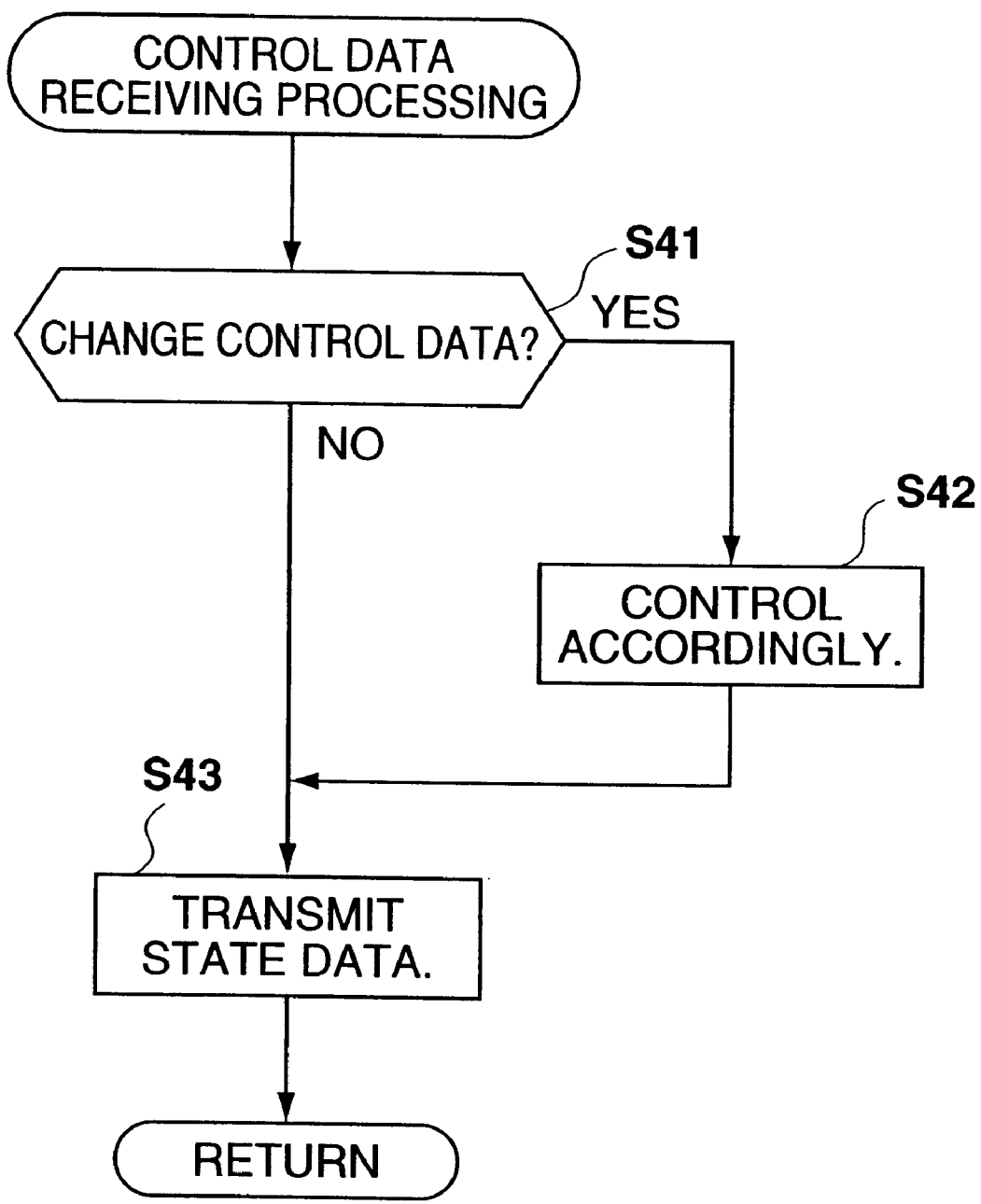
FIG. 18 is a flow chart of the processing of the CPU 99 shown in FIG. 8 for received control data.

Subsequently, how the video camera 5-1 (or video cameras 5-2, 5-3, and 25-1 to 25-5) receives and processes control data will be described with reference to the flow chart shown in FIG. 18.

Figure 17:
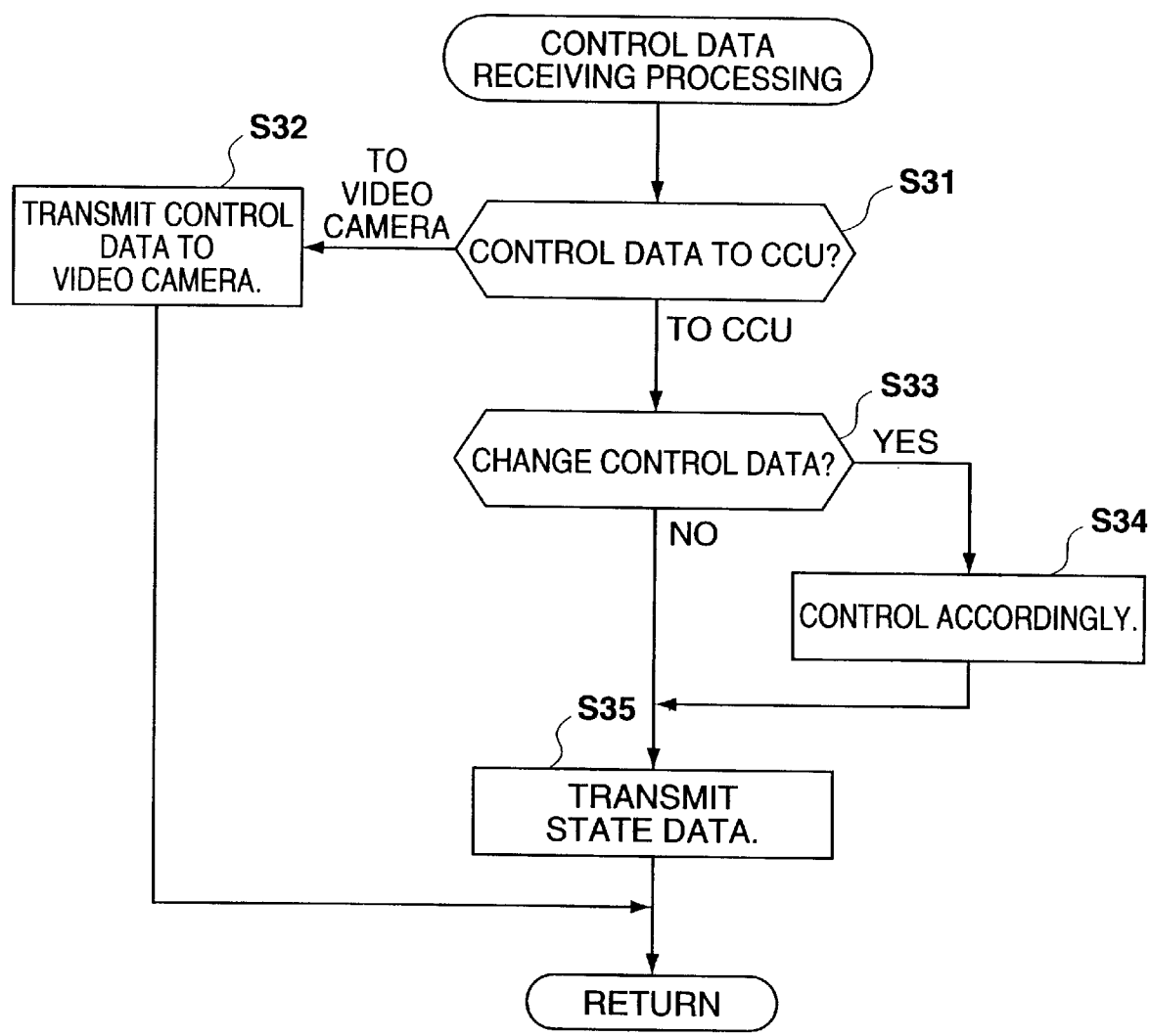
FIG. 17 is a flow chart of the processing of the CPU 81 shown in FIG. 7 for received control data.

For example, control data is transmitted from the CCU 4-1 to the video camera 5-1 in step S32 shown in FIG. 17 as described above, the CPU 99 of the video camera 5-1 (FIG. 8) receives the control data. Then, the CPU 99 detects in step S41 whether the received control data is change control data or not. In the case that the control data is detected to be change control data in step S41, the CPU 99 goes to step S42 to change the state of the video camera 5-1 according to the change control data. In other words, the CPU 99 changes the adjustment value of the iris, white level, or black level by the value corresponding to the parameter by controlling the iris 92, the analog signal processor 95, or the DSP 97.

Going to step S43, the CPU 99 sends back the state data and ends the processing. In other words, the CPU 99 recognizes the adjustment value updated corresponding to the received change control data and sets the value as a parameter in the received change control data. Furthermore, the CPU 99 updates both address and sender in the received change control data and changes the flag to the one representing an absolute value and calculates the checksum.

Then, the CPU 99 transmits the change control data updated such way to the CNU 1 as state data.

On the other hand, in the case that the control data is detected not to be change control data in step S41, that is, when the control data is reference control data, then the CPU 99 skips step S42 and goes to step S43 to send back state data and ends the processing. In other words, the CPU 99 recognizes the adjustment value (e.g. the current adjustment value of the iris, white level, or black level) corresponding to the attribute in the received reference control data and sets the value as a parameter in the reference control data. Furthermore, the CPU 99 updates both address and sender in the received reference control data and changes the flag to the one representing an absolute value and calculates the checksum. Then, the CPU 99 transmits the reference control data updated such way to the CNU 1 as state data.

In the embodiment described above, control level is divided into three levels; enabling state change and reading of state data (enabling transmission of both change control data and reference control data), enabling reading of state data (enabling transmission of only reference control data), and disabling both (disabling transmission of change control data and reference control data). Control levels, however, may be set as more as possible.

AS described above, the MSU 3 connected to the CNU 1 controls video cameras 5-1 to 5-3 and 25-1 to 25-5, but the RCPs 2-1 and 2-3, furthermore, the MSU 23 connected to the CNU 21, the RCPs 22-1 to 22-5 can control video cameras 5-1 to 5-3 and 25-1 to 25-5 in the same way.

Furthermore, in the CNU 1 or 21 described above, the matrix switch 61 is used to set the connection between input and output terminals, but a so-called computer may also be used to set the connection between input and output in a software aspect.

Figure 19:
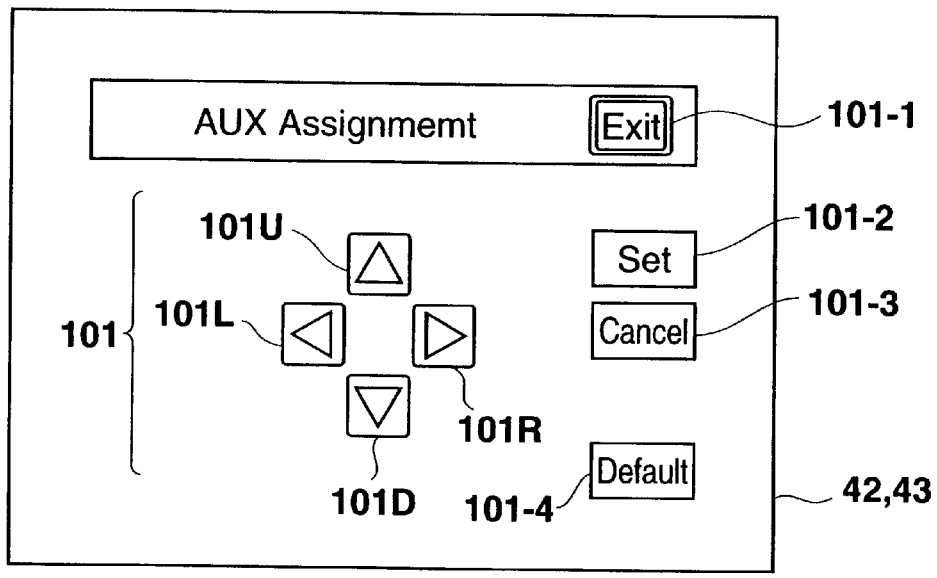
FIG. 19 is the AUX assignment screen.

While the menu screen shown in FIG. 9 is displayed on the monitor 42 of the MSU 3, for example, in the case that the "AUX Assign" button 100-4 is pressed, the control circuit 45 of the MSU 3 displays, for example, the AUX assignment screen as shown in FIG. 19 instead of the menu screen shown in FIG. 9. The AUX assignment screen items are the same as those of the MSU assignment screen shown in FIG. 10 except that the word "MSU Assignment" is replaced with the word "AUX Assignment".

Figure 20:
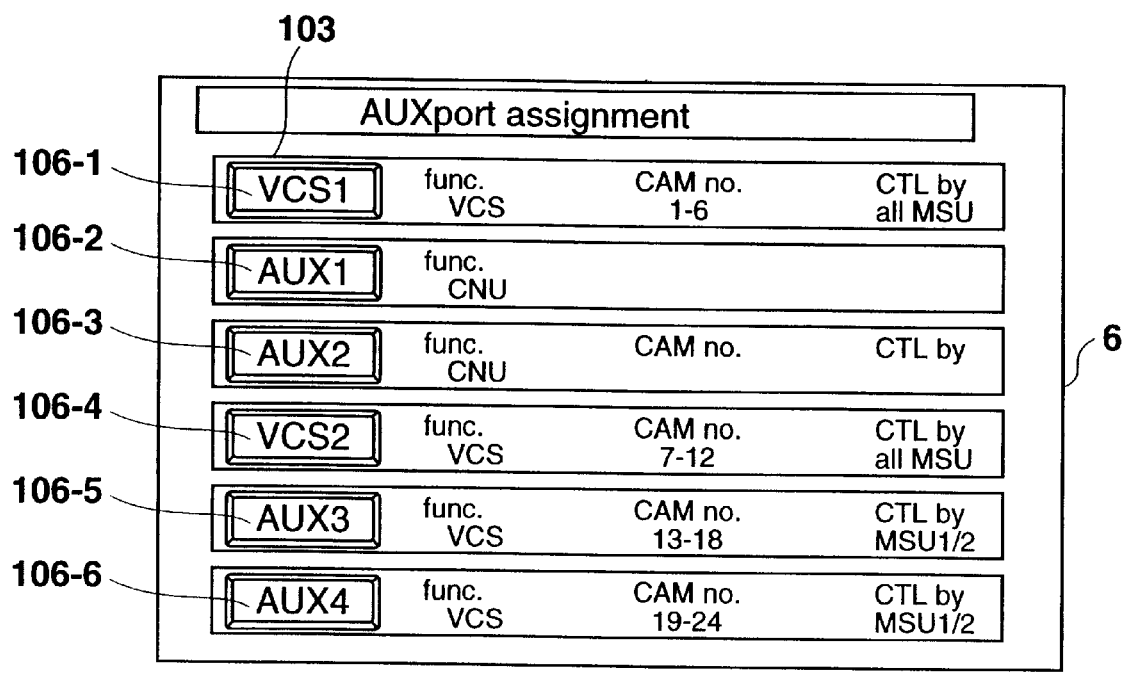
FIG. 20 is the device setting screen.

Furthermore, the control circuit 45 displays the AUX assignment screen (FIG. 19) on the monitor 42 and controls the CNU 1 to display, for example, the screen for selecting the devices to be assigned to the VCS terminal 70-14 and AUX terminals 70-15 and 70-16 of the extended board 10 (FIG. 10) mounted in the CNU 1 (hereinafter referred to as the device setting screen) as shown in FIG. 20 on the connected monitor 6.

The VCS1 button 106-1, the AUX1 button 106-2, and the AUX2 button 106-3 are used to set the devices to be assigned to the VCS terminal and the two AUX terminals of the extended board mounted in the upper slot of the two slots on the rear panel of the CNU 1. Consequently, as shown in FIG. 5, in the case that the extended board 10 is mounted in the upper slot of the CNU 1, the VCS1 button 106-1, the AUX1 button 106-2, and the AUX2 button 106-3 are used to set the devices to be assigned to the VCS terminal 70-14 and the AUX terminals 70-15 and 70-16.

The VCS1 button 106-4, the AUX1 button 106-5, and the AUX2 button 106-6 are used to set the devices to be assigned to the VCS terminal and the two AUX terminals of the extended board in the case that an extended board equivalent to the extended board 10 is mounted in the lower slot of the two slots (upper and lower) on the rear panel of the CNU 1.

Each function of the VCS1 button 106-1, the AUX1 button 106-2, the AUX2 button 106-3, the VCS1 button 106-4, the AUXI button 106-5, and the AUX2 button 106-6 are validated by moving the cursor 103 to the target position using the cursor key 101U, 101D, 101L, or 101R shown in FIG. 19, then pressing the "Set" button 101-2.

When assigning a device to each of the VCS terminal and the two AUX terminal respectively, "func", "CAM no", and "CTL by" are used. The item "func" specifies a device connected to a terminal. The item "CAM no." specifies the number of a video camera connected to a device connected to the terminal. (For example, this number corresponds to 1CAN, 2CAM, . . . shown in FIG. 12.) And, the item "CTL by" specifies an MSU that controls the devices connected to terminals. In FIG. 20, "all MSU" means that the MSU controls all devices. "MSU1/2" means that two MSU units are provided and one of them controls devices.

Figure 21:
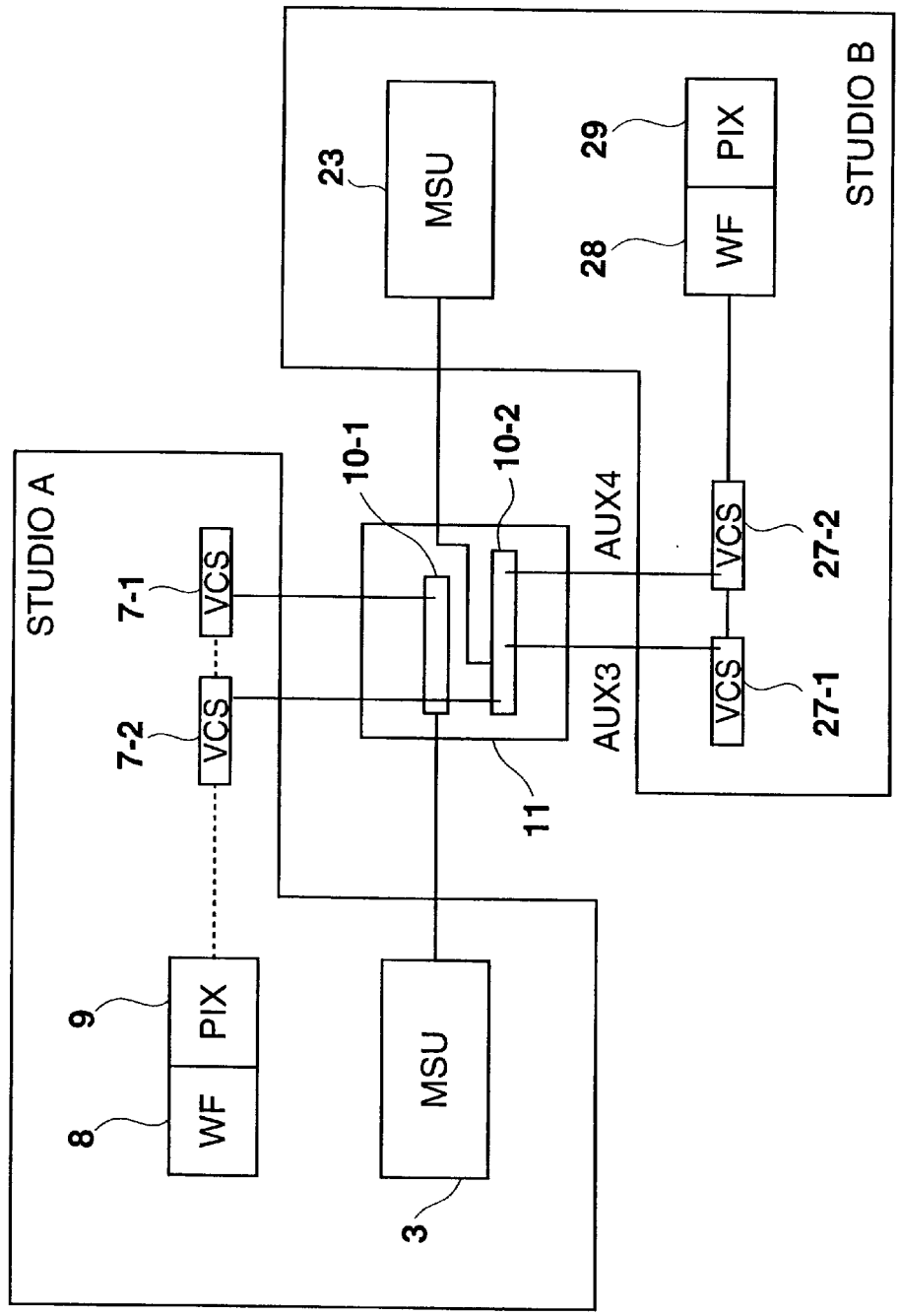
FIG. 21 is a block diagram of a configuration of the AV processing system of this invention in the second embodiment.

Subsequently, FIG. 21 shows the second embodiment of another AV processing system of this invention.

In this AV processing system, only one CNU 11 is provided, although two units of CNU 1 and 21 are provided in the AV processing system shown in FIG. 1. The CNU 11 is provided with two extended boards 10-1 and 10-2. The extended board 10-1 is connected to an MSU 3 and a VCS 7-1, as well as to an RCP and a CCU used in studio A (not illustrated). On the other hand, the extended board 10-2 is connected to an MSU 23, VCSs 7-1, 27-2, and 27-3, as well as to an RCP and a CCU used in studio B (not illustrated).

Each of the extended boards 10-1 and 10-2 is provided with a matrix switch 61, a CPU 62, and a memory 63 in the same way as in the first embodiment. The extended boards 10-1 and 10-2 are connected to each other via their CPUs 62.

Furthermore, one CPU 62 controls the input/output of control data from/to the other CPU 62 according to the set mode described above.

In other words, for example, in the case that the MSU 3 is set in the supervisor MSU mode, control data is supplied to the CPU 62 of the other extended board 10-2 via its CPU 62, then supplied to the corresponding CCU via the matrix switch 61. At this time, the CPU 62 of the extended board 10-2 outputs the control data to its CCU according to the preset control level (switch data stored in the memory 63).

In the same way, in the case that the MSU 23 is set in the supervisor MSU mode, each of the video cameras in studio A can be controlled according to the preset control level via the CCU connected to the extended board 10-1.

In this embodiment, one CNU 11 can execute the same processing as that of the AV processing system shown in FIG. 1 such way.

Figure 22:
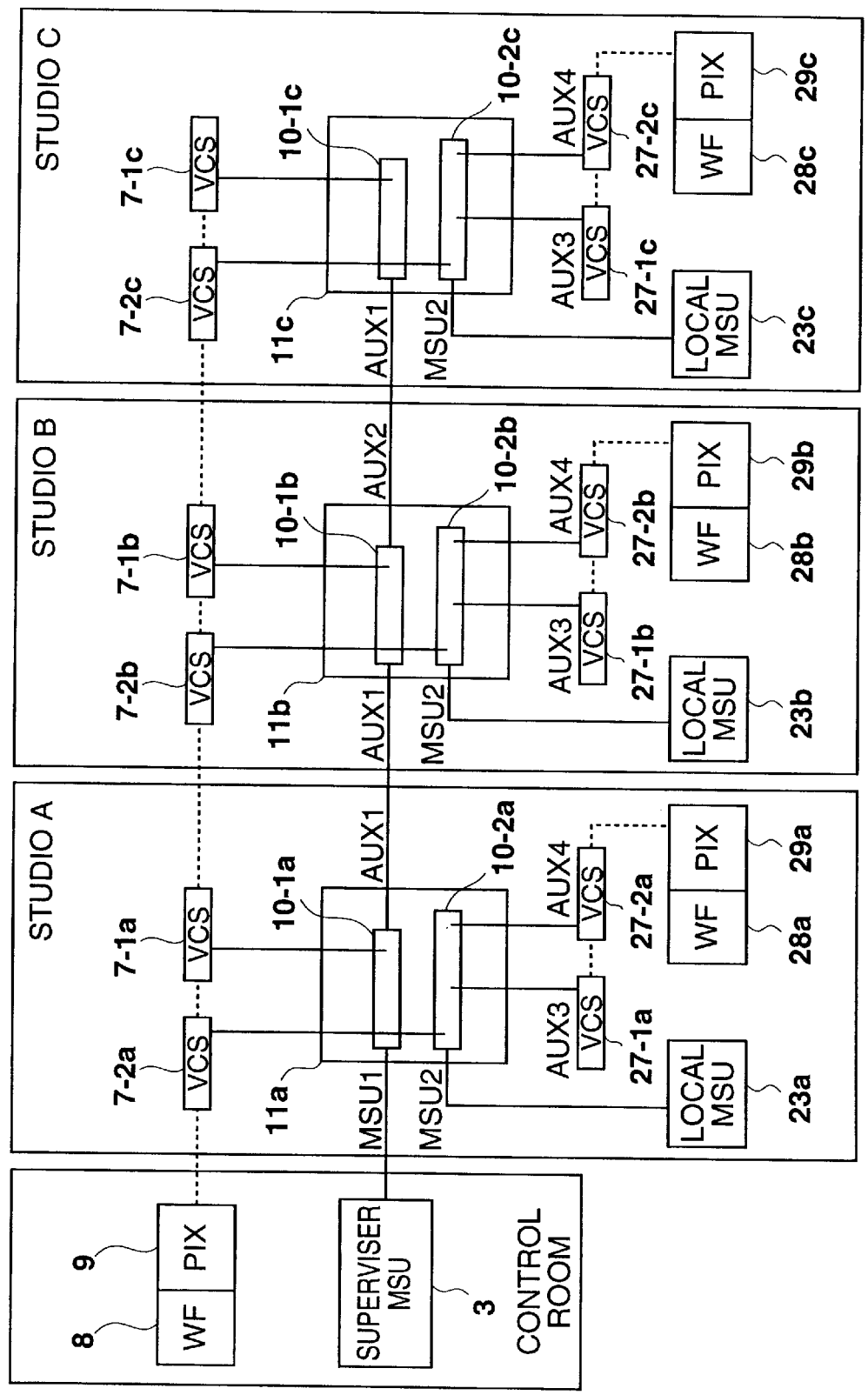
FIG. 22 is a block diagram of a configuration of the AV processing system of this invention in the third embodiment.

Subsequently, FIG. 22 shows a configuration of the AV processing system of this invention in the third embodiment.

In this AV processing system, local MSUs (set in the local MSU mode) 23a, 23b, and 23c are provided in three studios A, B, and C respectively and each of them is used to control its corresponding studio. At the same time, the supervisor MSU (set in the supervisor MSU mode) provided in the control room can also control each of those studios.

This AV processing system is formed by cascade-connections of the AV processing systems shown in FIG. 21. In other words, the AUX1 terminal of the extended board 10-1a of the CNU 11a in studio A is connected to the AUX1 terminal of the extended board 10-1b of the CNU 11b in studio B, and the AUX2 terminal of the extended board 10-1b of the CNU 11b in studio B is connected to the AUX2 terminal of the extended board 10-1c of the CNU 11c in studio C.

Subsequently, controlling of the video cameras in the third embodiment shown in FIG. 22 will be described.

The local MSU 23a in studio A controls the video cameras (not illustrated) via the CCU connected to the extended board 10-2a of the CNU 11a.

In the same way, the local MSU 23b in studio B controls the video cameras (not illustrated) via the CCU connected to the extended board 10-2b of the CNU 11b and the local MSU 23c in studio C controls the video cameras (not illustrated) via the CCU connected to the extended board 10-2c of the CNU 11c.

Since each of the local MSUs 23a, 23b, and 23c is set in the local MSU mode, it does not control video cameras in other studios.

On the other hand, the supervisor MSU 3 in the control room is set in the supervisor MSU mode, so it can control video cameras in any of the studios A to C.

When controlling the video cameras in studio A, the supervisor MSU 3 supplies control data to the CCU corresponding to the target video camera via the extended boards 10-1a and 10-2a of the CNU 11a.

When controlling the video cameras in studio B, the supervisor MSU 3 supplies control data to the CCU corresponding to the target video cameras via the extended board 10-1a of the CNU 11a and the extended boards 10-1b and 10-2b of the CNU 11b.

When controlling the video cameras in studio C, the supervisor MSU 3 supplies control data to the CCU corresponding to the target video cameras via the extended board 10-1a of the CNU 11a, the extended board 10-1b of the CNU 11b, and the extended boards 10-1c and 10-2c of the CNU 11c.

Since the supervisor MSU 3, the local MSUs 23a, 23b, and 23c are provided such way, the video cameras in all the studios and the video cameras in each studio can be controlled concurrently.

In this third embodiment, such AV devices as CCUs and video cameras are controlled, but electronic devices other than AV devices may also be controlled.

In the relay apparatus and the control system according to the present invention, control object information included in control data is extracted to determine whether it is possible to change the state of the electronic device corresponding the control object information. And, according to the detection result, transmission of control data and state data is controlled. In other words, control data is divided into change control data containing information to request a state change of the target electronic device and reference control data containing information to request a reference to the state of the target electronic device, and when it is detected to be possible to change the state of the target electronic device corresponding to the control object information, both change control data and reference control data are transmitted to the target electronic device corresponding to the control object information and the state data of the target electronic device is transmitted from the electronic device to the input device, which is the sender of the control data. On the other hand, when it is detected impossible to change the state of the electronic device corresponding to the control object information, only the reference control data is transmitted to the electronic device corresponding to the control object information and the state data of the electronic device is sent back to the input device, which is the sender of the control data. Consequently, an electronic device whose state can be changed and an electronic device whose state cannot be changed (only the state can be referenced) can be assigned to each of a plurality of input devices.

What is claimed is:

1. A control signal relay apparatus wherein said control signal relay apparatus receives a control signal from a first control signal input device and a control signal from a second control signal input device, said control signal from said first control signal input device including control object information for indicating an electronic device as a control object and control value information, and said control signal from said second control signal input device including said control object information and said control value information, controls a state of said electronic device indicated by said control object information out of a plurality of electronic devices according to said control signals from said first and second control signal input devices, receives a state signal expressing the state of said electronic device indicated by said control object information from said electronic device, and transmits said state signal to at least one of said first and second control signal input devices that has transmitted said control object information, said control signal relay apparatus comprising:

memory means for storing first information and second information, said first information indicating an electronic device controllable with said control signal from said first control signal input device and said second information indicating an electronic device controllable with said control signal from said second control signal input device;

control signal receiving means for receiving said control signals;

first transmission means for transmitting said control value information and state requesting information for requesting said state signal from said electronic device to said electronic device;

state signal receiving means for receiving said state signal;

state signal transmitting means for transmitting said state signal to at least one of said first and second control signal input devices that has transmitted said control object information;

extracting means for extracting said control object information indicating said control object electronic device from said control signals received by said control signal receiving means;

detecting means for detecting whether it is possible to control said electronic device selected by said control object information with said control signals by comparing said control object information with said first or second information stored in said memory means, and for detecting whether or not it is possible to obtain said state signal from said electronic device in response to said state requesting information; and controlling means for controlling said first transmitting means and said state signal transmitting means so that when said detecting means detects that an electronic device corresponding to said control object information can be controlled with said control signal, said first transmitting means transmits both of said control value information and said state requesting information to said electronic device corresponding to said control object information, then said state signal transmitting means sends back said state signal received from the electronic device corresponding to said control object information to at least one of said first and second control signal input devices that has transmitted said control signal, wherein when said detecting means detects that said electronic device corresponding to said control object information cannot be controlled with said control signal, said first transmitting means transmits only said state requesting information to the electronic device corresponding to said control object information, then said state signal transmitting means sends back said state signal received from the electronic device corresponding to said control object information to at least one of said first or second control signal input devices that has transmitted said control signal, and when said detecting means detects that said electronic device corresponding to said control object information cannot be controlled with said control signal and cannot supply said state signal in response to said state requesting information, said first transmitting means does not transmit said control value information nor said state requesting information to said electronic device corresponding to said control object information.

2. A control signal relay apparatus as defined in claim 1, wherein said memory means stores said first and second information under the control of said first or second control signal input means.

3. A control signal relay apparatus as defined in claim 1, wherein said controlling means controls said first transmitting means so that when said detecting means detects that an electronic device corresponding to said control object information cannot be controlled with said control signal, said control value information is cleared to zero, and accordingly, said first transmitting means substantially does not transmit said control value information.

4. A control system for electronic devices, comprising:
   a first control signal input device;
   a second control signal input device; and
   a control signal relay apparatus receiving a control signal from said first control signal input device and a control signal from said second control signal input device, said control signal from said first control signal input device including control object information for indicating an electronic device as a control object and control value information, and said control signal from said second control signal input device including said control object information and said control value information, controlling a state of said electronic device indicated by said control object information out of a plurality of electronic devices according to said control signals from said first and second control signal input devices, receiving a state signal expressing the state of said electronic device indicated by said control object information from said electronic device, and transmitting said state signal to at least one of said first and second control signal input devices that has transmitted said control object information,
   said control signal relay apparatus comprising:
      memory means for storing first information and second information, said first information indicating an electronic device controllable with said control signal from said first control signal input device and said second information indicating an electronic device controllable with said control signal from said second control signal input device;
      control signal receiving means for receiving said control signals;
      first transmission means for transmitting said control value information and state requesting information for requesting said state signal from said electronic device to said electronic device;
      state signal receiving means for receiving said state signal;
      state signal transmitting means for transmitting said state signal to at least one of said first and second control signal input devices that has transmitted said control object information;
      extracting means for extracting said control object information indicating said control object electronic device from said control signals received by said control signal receiving means;
      detecting means for detecting whether it is possible to control said electronic device indicated by said control object information with said control signals by comparing said control object information with said first or second information stored in said memory means, and for detecting whether or not it is possible to obtain said state signal from said electronic device in response to said state requesting information; and
      controlling means for controlling said first transmitting means and said state signal transmitting means so that when said detecting means detects that an electronic device corresponding to said control object information can be controlled with said control signal, said first transmitting means transmits both of said control value information and said state requesting information to said electronic device corresponding to said control object information, then said state signal transmitting means sends back said state signal received from the electronic device corresponding to said control object information to at least one of said first and second control signal input devices that has transmitted said control signal, wherein when said detecting means detects that said electronic device corresponding to said control object information cannot be controlled with said control signal, said first transmitting means transmits only said state requesting information to the electronic device corresponding to said control object information, then said state signal transmitting means sends back said state signal received from the electronic device corresponding to said control object information to at least one of said first and second control signal input devices that has transmitted said control signal, and when said detecting means detects that said electronic device corresponding to said control object information cannot be controlled with said control signal and cannot supply said state signal in response to said state requesting information, said first transmitting means does not transmit said control value information nor said state requesting information to said electronic device corresponding to said control object information.

5. A control system as defined in claim 4, wherein said memory means stores said first and second information under the control of said first or second control signal input means.

6. A control system as defined in claim 4, wherein said controlling means controls said first transmitting means so that when said detecting means detects that an electronic device corresponding to said control object information cannot be controlled with said control signal, said control value information is cleared to zero, and accordingly, said first transmitting means substantially does not transmit said control value information.

7. A control system as defined in claim 4, wherein said control signal relay apparatus comprises a first relay device, and a second relay device connected to said first relay device, and said electronic devices are connected to one of said first and second relay devices.

8. A control system as defined in claim 4, wherein each of said first and second control signal input devices is provided with display means for displaying numericals according to state signals received from said control signal relay apparatus.

9. A relay apparatus wherein said relay apparatus receives control data transmitted from a plurality of input devices each of which control data includes control object information indicating an electronic device as a control object and control information expressing a control item of said electronic device and transmits said control data to at least one of said electronic devices indicated by said control object information out of a plurality of said electronic devices, and further receives state data expressing a state of said electronic device transmitted from at least one of said electronic devices that has received said control data and transmits said state data to at least one of said input devices which has transmitted said control data out of a plurality of said input devices so as to repeat said control data and state data said relay apparatus, comprising:

control data receiving means for receiving said control data transmitted from said input devices;

control data transmitting means for transmitting said control data to said electronic device;

state data receiving means for receiving said state data transmitted from said electronic device;

state data transmitting means for transmitting said state data to said input device;

extracting means for extracting said control object information from said control data received by said control data receiving means;

detecting means for detecting whether the state of said electronic device corresponding to said control object information can be changed; and controlling means for controlling said control data transmitting means and said state data transmitting means according to detection results of said detecting means said control data including change control data with information arranged for requesting change of the state of said electronic device and reference control data with information arranged for requesting to refer to the state of said electronic device, and said controlling means controlling said control data transmitting means and said state data transmitting means so that when said detecting means detects that the state of said electronic device corresponding to said control object information can be changed, said control data transmitting means transmits both of said change control data and reference control data to said electronic device corresponding to said control object information and said state data transmitting means transmits said state data received from said electronic device to said input device that has transmitted said control data, wherein when said detecting means detects that the state of the electronic device corresponding to said control object information cannot be changed, said control data transmitting means transmits only said reference control data out of said change control data and said reference control data to said electronic device corresponding to said control object information and said state data transmitting means transmits said state data received from said electronic device to said input device that has transmitted said control data, and when said detecting means detects that the state of said electronic device corresponding to said control object information cannot be changed and a determination is made that said electronic device cannot supply said state data in response to said reference control data, said control data transmitting means does not transmit said change control data nor said reference control data to said electronic device corresponding to said control object information.

10. A relay apparatus as defined in claim 9 further comprising memory means for storing information expressing an electronic device whose state can be changed by operating each of a plurality of said input devices, said memory means providing said information having been stored therein for being compared with said control object information by said detecting means so that said detecting means detects whether it is possible to change the state of said electronic device corresponding to said control object information.

11. A relay apparatus as defined in claim 10, wherein said memory means stores information expressing said electronic device whose state can be changed under the control of each of said input devices.

12. A control signal relay apparatus as defined in claim 9, wherein said controlling means controls said control data transmitting means so that when said detecting means detects that the state of said electronic device corresponding to said control object information included in said control data cannot be changed, said control data is changed to said reference control data by changing said control information included in said control data to information for requesting the state of said electronic device to be referred to and said control data transmitting means transmits said reference control data to said electronic device corresponding to said control object information.

13. A control system for controlling a plurality of electronic devices wherein said control system comprises a plurality of input devices each transmitting control data including control object information indicating an electronic device as a control object and control information expressing a control item, and a relay apparatus for repeating said control data and state data by receiving said control data transmitted from a plurality of said input devices and transmitting said control data to at least one of the electronic devices indicated by said control object information out of a plurality of said electronic devices, and further by receiving said state data expressing a state of said selected electronic device transmitted from at least one of said electronic devices that has received said control data and transmitting said state data to at least one of said input devices which has transmitted said control data out of a plurality of said input devices, said relay apparatus comprising:

control data receiving means for receiving said control data transmitted from said input devices;

control data transmitting means for transmitting said control data to said electronic device;

state data receiving means for receiving said state data transmitted from said electronic device;

state data transmitting means for transmitting said state data to said input device;

extracting means for extracting said control object information from said control data received by said control data receiving means;

detecting means for detecting whether the state of said electronic device corresponding to said control object information can be changed; and controlling means for controlling said control data transmitting means and said state data transmitting means according to detection results of said detecting means, said control data including change control data with information arranged for requesting change of the state of said electronic device and reference control data with information arranged for requesting to refer to the state of said electronic device, and said controlling means controlling said control data transmitting means and said state data transmitting means so that when said detecting means detects that the state of said electronic device corresponding to said control object information can be changed, said control data transmitting means transmits both of said change control data and reference control data to said electronic device corresponding to said control object information and said state data transmitting means transmits said state data received from said electronic device to said input device that has transmitted said control data, wherein when said detecting means detects that the state of the electronic device corresponding to said control object information cannot be changed, said control data transmitting means transmits only said reference control data out of said change control data and said reference control data to said electronic device corresponding to said control object information and said state data transmitting means transmits said state data transmitted from said electronic device to said input device that has transmitted said control data, and when said detecting means detects that the state of said electronic device corresponding to said control object information cannot be changed and a determination is made that said electronic device cannot supply said state data in response to said reference control data, said control data transmitting means does not transmit said change control data nor said reference control data to said electronic device corresponding to said control object information.

14. A control system as defined in claim 13 further comprising memory means for storing information expressing an electronic device whose state can be changed by operating each of a plurality of said input devices, said memory means providing said information having been stored therein for being compared with said control object information by said detecting means so that said detecting means detects whether it is possible to change the state of said electronic device corresponding to the control object information.

15. A control system as defined in claim 14, wherein said memory means stores information expressing said electronic device whose state can be changed under the control of each of said input devices.

16. A control system as defined in claim 13, wherein said controlling means controls said control data transmitting means so that when said detecting means detects that the state of said electronic device corresponding to said control object information included in said control data cannot be changed, said control data is changed to said reference control data by changing said control information included in said control data to information for requesting the state of said electronic device to be referred to and said control data transmitting means transmits said reference control data to said electronic device corresponding to said control object information.

17. A control system as defined in claim 13, wherein said control system comprises a plurality of said relay apparatuss each of which is connected to at least one of other relay apparatuss, and a plurality of said electronic devices are connected to at least one of a plurality of said relay apparatuss.

18. A control system as defined in claim 13, wherein each of said input devices comprises display means for displaying said state data transmitted from said relay apparatuss.

* * * * *

UNITED STATES PATENT AND TRADEMARK OFFICE
CERTIFICATE OF CORRECTION

PATENT NO. : 6,020,935
DATED : September 11, 1997
INVENTOR(S) : Jean W. Desir

It is certified that error appears in the above-identified patent and that said Letters Patent is hereby corrected as shown below:

> On the title page, item [30] under Foreign Application Priority Data, 9-217321 should be deleted.

Signed and Sealed this

Twenty-seventh Day of February, 2001

*Attest:*

NICHOLAS P. GODICI

*Attesting Officer*    *Acting Director of the United States Patent and Trademark Office*